(12) United States Patent
Dimitrov

(10) Patent No.: US 10,741,143 B2
(45) Date of Patent: Aug. 11, 2020

(54) DYNAMIC JITTER AND LATENCY-TOLERANT RENDERING

(71) Applicant: NVIDIA Corporation, Santa Clara, CA (US)

(72) Inventor: Rouslan Dimitrov, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/166,880

(22) Filed: Oct. 22, 2018

(65) Prior Publication Data
US 2019/0164518 A1 May 30, 2019

Related U.S. Application Data

(60) Provisional application No. 62/591,662, filed on Nov. 28, 2017.

(51) Int. Cl.
*G09G 5/00* (2006.01)
*G06T 3/00* (2006.01)
(Continued)

(52) U.S. Cl.
CPC ........... *G09G 5/001* (2013.01); *G02B 27/017* (2013.01); *G06T 3/0093* (2013.01); *A63F 13/355* (2014.09);
(Continued)

(58) Field of Classification Search
CPC .................. A63F 13/355; A63F 13/358; A63F 2300/534; A63F 2300/535; G02B 27/017;
(Continued)

(56) References Cited

U.S. PATENT DOCUMENTS 5,727,002 A * 3/1998 Miller ................... H04L 1/1614
709/237
5,737,531 A * 4/1998 Ehley ...................... H04L 29/06
709/208
(Continued)

FOREIGN PATENT DOCUMENTS

CN    102231828 A  * 11/2011
CN    102547243 A  *  7/2012
(Continued)

OTHER PUBLICATIONS

Jasevičiūtė, Vita & Plonis, Darius & Serackis, Artūras. (2014). Dynamic adaptation of the jitter buffer for video streaming applications. 10.1109/AIEEE.2014.7020318. (Year: 2014).*

*Primary Examiner* — Michael J Eurice
(74) *Attorney, Agent, or Firm* — Nixon & Vanderhye, P.C.

(57) ABSTRACT

Systems and techniques for streaming video with dynamic jitter tolerance are described. In one example, a system includes a server executing an application and generating image frames associated with the application at a frame rate, and a client which displays the image frames on a display that has a predetermined refresh rate and which monitors arrival times of the image frames in relation to the predetermined refresh rate. The server is further configured to dynamically change the frame rate based on the monitoring so that the frame rate more closely corresponds to the predetermined refresh rate of the client's display.

25 Claims, 15 Drawing Sheets

(51) Int. Cl.
*G02B 27/01* (2006.01)
*A63F 13/355* (2014.01)
*A63F 13/358* (2014.01)
*G06T 5/00* (2006.01)

(52) U.S. Cl.
CPC ....... *A63F 13/358* (2014.09); *A63F 2300/534* (2013.01); *A63F 2300/535* (2013.01); *G02B 2027/0178* (2013.01); *G06T 5/005* (2013.01); *G09G 2320/0252* (2013.01); *G09G 2340/0435* (2013.01); *G09G 2350/00* (2013.01); *G09G 2360/18* (2013.01)

(58) Field of Classification Search
CPC .......... G02B 2027/0178; G06F 3/1454; G06T 3/0093; G09G 5/001; G09G 5/12; G09G 5/005; G09G 5/393; G09G 5/395; G09G 5/04; G09G 2320/0252; G09G 2340/02; G09G 2340/0435; G09G 2350/00; G09G 2360/18; G09G 2370/022; G09G 2370/04; H04L 65/80; H04L 65/602; H04L 47/11; H04L 47/26; H04L 65/4092; H04L 65/601; H04L 29/06476; H04L 43/16; H04L 47/30; H04L 47/38; H04L 65/1083; H04N 21/6377; H04N 21/6373; H04N 19/164; H04N 21/2402; H04N 21/44004; H04N 21/44209

See application file for complete search history.

(56) References Cited

U.S. PATENT DOCUMENTS

| | | | | |
|---|---|---|---|---|
| 6,091,777 | A * | 7/2000 | Guetz | H04N 19/172 375/240.03 |
| 7,844,727 | B2 * | 11/2010 | Leon | H04L 65/80 370/229 |
| 8,903,223 | B1 * | 12/2014 | Orady | H04N 21/440281 386/248 |
| 9,781,477 | B2 * | 10/2017 | Mighani | H04N 21/4325 |
| 10,015,224 | B1 * | 7/2018 | Shen | H04L 65/4084 |
| 10,116,989 | B1 * | 10/2018 | Shen | H04N 21/44004 |
| 2010/0166056 | A1 * | 7/2010 | Perlman | A63F 13/358 375/240.01 |
| 2010/0166058 | A1 * | 7/2010 | Perlman | A63F 13/12 375/240.02 |
| 2010/0166062 | A1 * | 7/2010 | Perlman | A63F 13/355 375/240.05 |
| 2010/0166063 | A1 * | 7/2010 | Perlman | H04N 21/2662 375/240.07 |
| 2010/0166064 | A1 * | 7/2010 | Perlman | A63F 13/358 375/240.07 |
| 2010/0166065 | A1 * | 7/2010 | Perlman | A63F 13/12 375/240.07 |
| 2010/0166066 | A1 * | 7/2010 | Perlman | A63F 13/12 375/240.07 |
| 2010/0166068 | A1 * | 7/2010 | Perlman | A63F 13/86 375/240.12 |
| 2010/0167809 | A1 * | 7/2010 | Perlman | H04N 21/4781 463/24 |
| 2010/0167816 | A1 * | 7/2010 | Perlman | A63F 13/12 463/30 |
| 2010/0304731 | A1 * | 12/2010 | Bratton | H04N 5/232 455/420 |
| 2011/0066673 | A1 * | 3/2011 | Outlaw | H04L 65/4092 709/203 |
| 2011/0122063 | A1 * | 5/2011 | Perlman | A63F 13/335 345/161 |
| 2011/0126255 | A1 * | 5/2011 | Perlman | H04N 19/14 725/116 |
| 2012/0271920 | A1 * | 10/2012 | Isaksson | H04L 47/2416 709/219 |
| 2014/0143297 | A1 * | 5/2014 | Ibarria | H04L 65/60 709/203 |
| 2014/0281023 | A1 * | 9/2014 | Apte | H04L 69/02 709/235 |
| 2014/0286438 | A1 * | 9/2014 | Apte | H04N 21/2343 375/240.26 |
| 2014/0330888 | A1 * | 11/2014 | Dave | H04L 67/42 709/203 |
| 2015/0020135 | A1 * | 1/2015 | Frusina | H04N 21/4621 725/116 |
| 2015/0119142 | A1 * | 4/2015 | Abbott | G02B 27/01 463/31 |
| 2015/0189126 | A1 * | 7/2015 | Xie | G09G 5/005 348/500 |
| 2017/0142029 | A1 * | 5/2017 | Xia | H04L 65/602 |
| 2017/0187635 | A1 * | 6/2017 | Subasingha | H04L 47/283 |
| 2019/0215729 | A1 * | 7/2019 | Oyman | H04L 65/80 |
| 2019/0364302 | A1 * | 11/2019 | Perlman | H04L 65/604 |

FOREIGN PATENT DOCUMENTS

| | | | | |
|---|---|---|---|---|
| CN | 102231828 B | * | 5/2013 | |
| WO | WO-2015188678 A1 | * | 12/2015 | .......... H04N 21/647 |

* cited by examiner

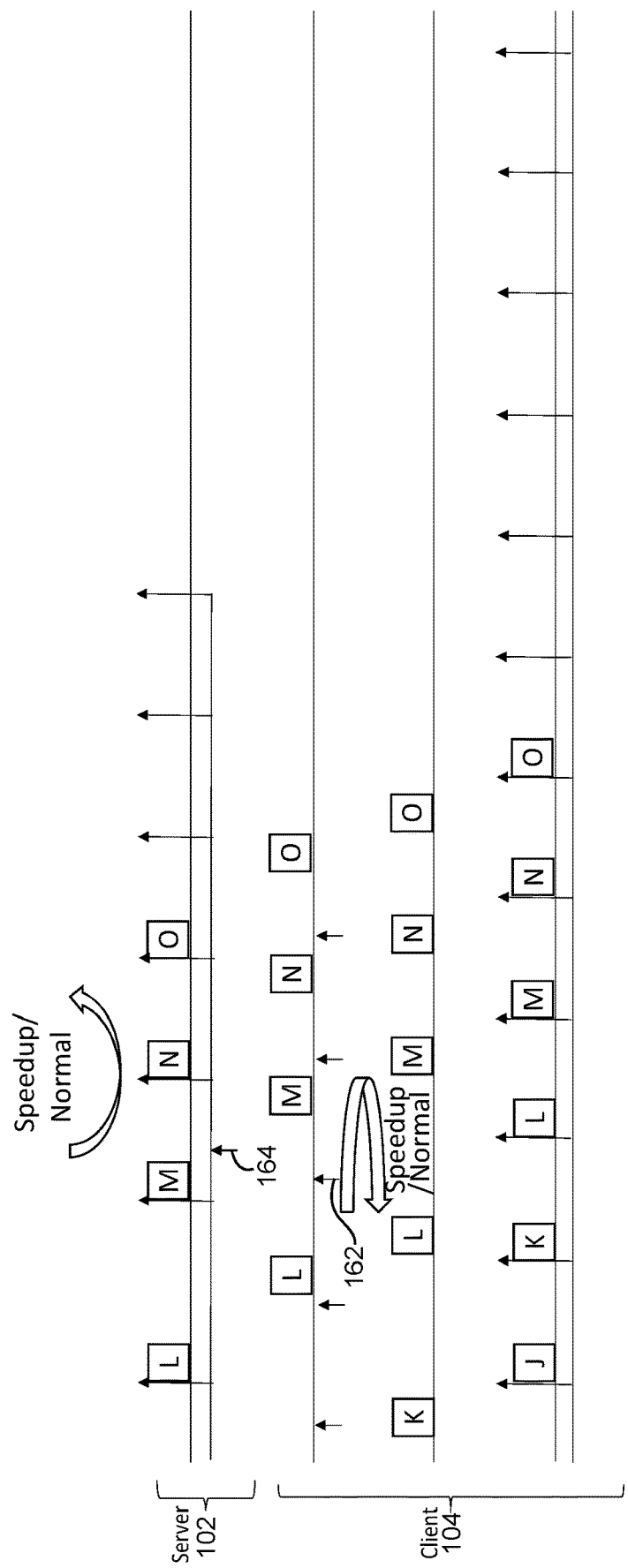

DYNAMIC JITTER AND LATENCY-TOLERANT RENDERING

CROSS-REFERENCE TO RELATED APPLICATIONS

This application claims priority to U.S. Provisional Patent Application No. 62/591,662 filed on Nov. 28, 2017, titled "Cloud Rendering PLL-based Vsync with Dynamic Jitter Tolerance" the entire content of which is herein incorporated by reference.

FIELD OF THE INVENTION

This disclosure relates to distributed systems that send rendered video over a communication link, more particularly to techniques for sending video rendered remotely over a network exhibiting jitter for display on a display device, and even more particularly to displaying video on a remote display device where a rendering engine is unable to detect the refresh cycles of the remote display device.

BACKGROUND

High definition virtual reality (VR) and augmented reality (AR) are becoming pervasive. Head-mounted display devices such as virtual reality goggles (VR goggles) and AR glasses can provide a highly immersive experience. Modern cameras and rendering engines such as NVIDIA GeForce GPUs produce high resolution photorealistic imagery. In some such systems, video is generated and encoded by a camera, GPU or other source. The source can often produce video in interactive response to the user's pose and/or other user input (e.g., direction of gaze). The video is transmitted to a local processor associated with VR goggles or AR glasses worn by a user. The VR goggles or AR glasses receive and display the transmitted video frames at regular intervals.

In more detail, in order to create the perception of movement, many display devices such as VR goggles operate by having the screen redrawn at a regular periodic rate known as the display's "refresh rate". The display device redraws the image tens or hundreds of times each second as determined by the refresh rate. The refresh rate may be fixed or configurable for a particular display device depending on its type and capabilities, and typically is in the range of 60 to 200 frames per second (fps). For example, when the VR goggles or AR glasses operate at a 60 frames per second (fps) refresh rate, they display a new image each 16.67 milliseconds. This time period is sometimes called a "refresh interval" because the display refreshes with a new image frame at the end of each such time interval. The graphics rendering engine or other source is responsible for generating and sending image frames at the requisite frame rate so the display will have the next image frame available when it needs to display it.

It takes a certain finite amount of time to render and display each new image. Such delay is often referred to as "latency". Latency can especially important in VR and AR applications where the presented images need to keep up with changes in the user's gaze, head direction and the like. For example, if the user quickly turns her head to the left, the display must be able to track the quick head turning and display a series of images appropriate to the user's changing head orientations. The user will instantly notice the delay if the display falls behind. Such delay can lead to lack of realism, disorientation and even nausea.

To reduce latency, the rendering engine typically operates at least one image frame ahead and stores the next image frame in a display buffer memory local to the display so the frame is present when the display needs it. Some display systems use more than one display buffer. For example, in some computers, two display buffers are used so that while the contents of a first display buffer are being written to the display device, the computer or GPU can write a newly generated image to the second buffer. The display system can be configured to switch between the buffers in an alternating manner.

Fast rendering hardware is used to keep up with the display refresh rate, and various techniques are known for reducing image complexity and/or resolution to ensure image rendering does not fall behind. Once a next frame is stored in the display buffer memory, display refresh hardware typically reads the contents of the display buffer memory and provides it to the display device at the requisite refresh time intervals demanded by the display.

Real-time graphics artifacts such as those described above are more frequently observed in environments where rendering engine must communicate with the display via a remote communications link such as the Internet and/or a wireless connection (e.g., WIFI, GSM cellular telephone data network, etc.). Since signals do not travel instantaneously through space, such links will inherently exhibit some delay or latency. Additionally, well known video compression techniques can be used to ensure that there is enough time to transmit images of desired resolution over the bandwidth the communications link offers.

Due to variable transmission characteristics of such communications links, latency may vary from one transmission to the next. Such variability is typically referred to as jitter, meaning deviation from true periodicity of a presumably periodic signal (i.e., transmitted at the periodic display refresh rate). Such jitter can cause some images or parts of images to arrive quickly, whereas other images or parts of images may take a longer time to traverse the link from the source to the destination. In these environments, the amount of network jitter may increase when the path from the rendering engine to the VR goggles or other display includes many hops and/or many alternate paths, when transmission errors and/or bandwidth limitations require retransmission and/or other transient network degrading conditions occur.

Screen tearing and/or other real-time graphics artifacts can occur when the process by an image renderer of writing an image into the display buffer is not adequately synchronized with the operation of the display device. "Screen tearing" results when parts of two different images are simultaneously displayed on the display device. Screen tearing can occur when the content of a display buffer from which the display is drawn is changed before the display device draws a complete frame. For example, if the rendering engine begins writing a new image to a buffer while the display device is still reading an earlier image out of the same buffer, one part of the display will show a part of the earlier image while another part of the display show a part of the new image. Another real-time graphics artifact known as "stutter" occurs when writing into the display buffer is delayed with respect to reading according to the refresh rate of the display, and the display reads and redraws stale (already previously displayed) content from the buffer.

As cloud-based graphics rendering gains in popularity and therefore as more users begin to view remotely rendered video images on a local display device, it becomes even more important to address issues such as the appearance of real-time graphics artifacts noted above in the displayed video. Cloud-based rendering is only one example application; numerous other applications exist where the rendering of the video occurs at a first location and where the display of that rendered video at a second, different location should be performed without generating real-time graphic artifacts such as those described above.

Real-time graphics artifacts due to network jitter is not an issue that is restricted to certain type of processors, and may occur when the rendering engine and/or the displaying client device have CPU, GPU and/or any other type of processor capable of image generation and display. In the past, GPU functions were often limited to a well-defined set of graphics operations. This changed when GPUs became programmable. For example, in 2001, NVidia released its GEForce3 NV20 GPU providing programmable vertex and pixel shaders. Later, Nvidia developed the CUDA® parallel computing platform and programming model for general computing on graphical processing units (GPUs). With CUDA®, developers have been able to dramatically speed up computing applications by using GPU processing capabilities to perform computing tasks in addition to graphics tasks. Thus, GPUs have become a highly versatile and powerful processor handling the processing for a bulk of modern video games and complex applications, particularly those that involve substantial video and/or image rendering. The GPUs (and perhaps also other types of processors) have evolved to be capable of real-time rendering of highly complex detailed images resulting from highly complex calculations. However, in order to improve the user experience associated with cloud-based image rendering for use by user's not directly connected to the rendering engines, it is desirable that real-time graphics rendering artifacts such as those described above be eliminated or at least reduced.

Thus, there is a need for systems and methods for improving the display of images on a local display device when the images are initially rendered in a remote device.

SUMMARY

Example embodiments rectify some of the deficiencies of the techniques described above for video streaming. Methods, computer readable mediums, and systems are disclosed for providing dynamic jitter tolerance for displaying streamed video.

According to an embodiment, a system comprises a frame provider and a frame consumer. The frame provider is configured to provide a sequence of image frames for consumption by a frame consumer. The frame consumer is configured to consume the provided sequence of image frames at a predetermined consumption rate, and to monitor arrival times of the provided image frames in relation to the predetermined consumption rate. The frame provider is further configured to adjust a rate at which it provides image frames to the frame consumer based at least in part on the monitoring.

According to an embodiment a method of streaming video from a video rendering server device to a client device connected to a display device is provided. The method includes receiving monitoring information from the client device, where the monitoring information includes arrival times of respective image frames of the streaming video. The method also includes adapting a frame rate at which image frames of the streaming video is generated by either speeding up or slowing down the frame rate in accordance with the received monitoring information in order to transmit the image frames with improved synchronization with a refresh interval of the display device.

According to an embodiment, an electronic device includes a display, a memory, a network interface and at least one processor configured to repeatedly measure differences between respective arrival times at the electronic device of image frames containing images generated by an application running on a remote server and expected arrival times for the image frames. The at least one processor is also configured to transmit information regarding the measured differences to the remote server, adapt a size of a jitter buffer in the memory in accordance with at least the measured differences, insert said data frames in the adapted jitter buffer, and display images on the display device based on said data frames inserted in the adapted jitter buffer.

BRIEF DESCRIPTION OF THE DRAWINGS

FIG. 1B and FIG. 1C illustrates example image frame transmission and arrival time sequences in a dynamic jitter tolerant rendering system such as that shown in FIG. 1A, according to some example embodiments.

DETAILED DESCRIPTION

Figure 1A:
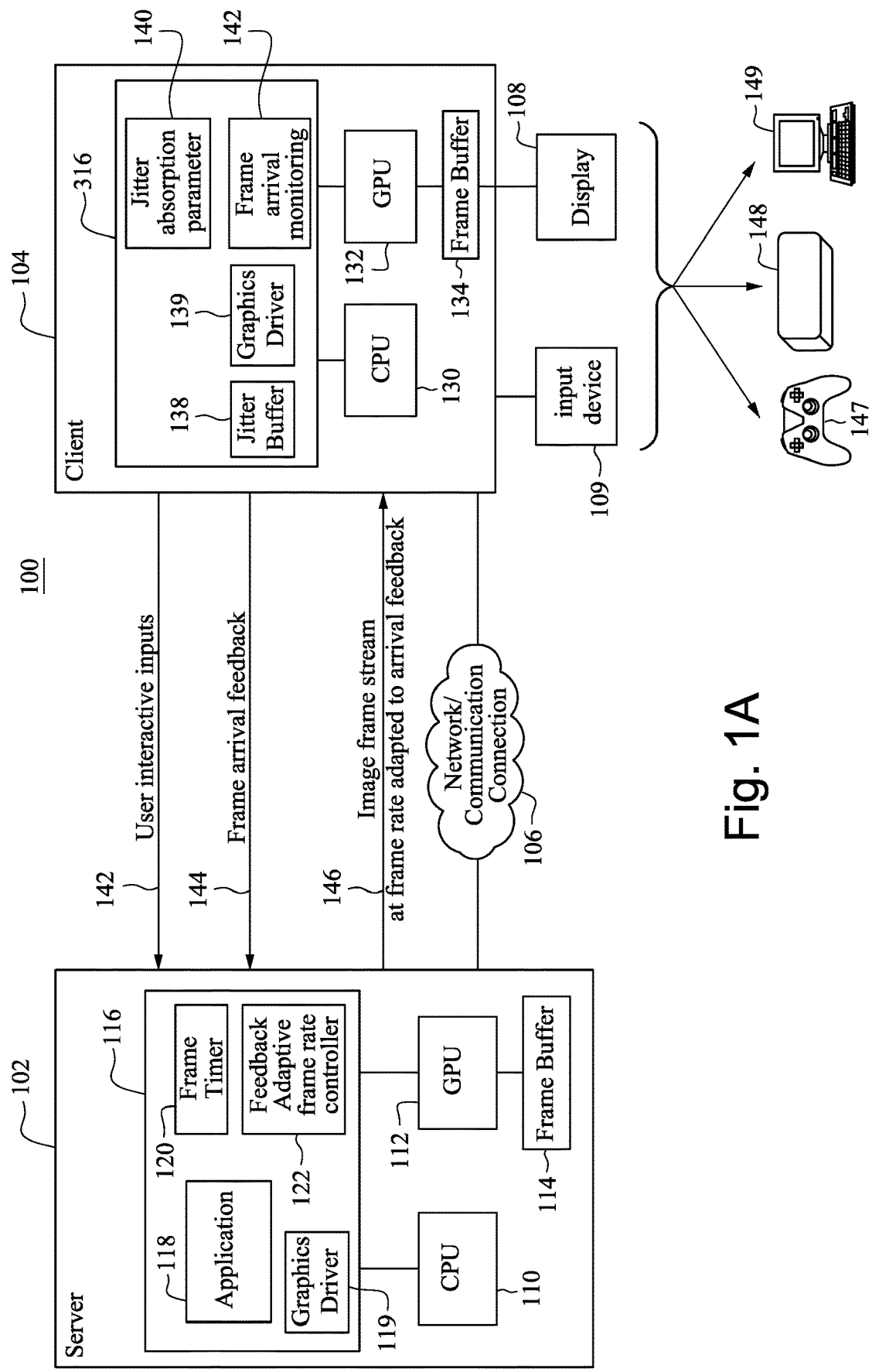
FIG. 1A illustrates a client-server dynamic jitter tolerant rendering system, according to certain example embodiments.

Example embodiments provide systems and methods that alleviate effects of jitter and other network transmission characteristics that cause image quality degradation in streamed video. Example embodiments eliminate or reduce real-time image artifacts such as latency, stutter and frame-tearing, and may also reduce power consumed for rendering video. More particularly, some example embodiments provide for the image frame generation by an application running on a remote server device to be rate-controlled based on feedback regarding image frame arrivals at the client device. The frame rate at the server device is thus controlled in example embodiments so that the frames can be displayed at the display rate of the client device in a manner responsive to user interactions and with quality-degrading real-time graphics artifacts reduced or eliminated. Embodiments are not limited to wide area network or cloud environments. In some embodiments, the running and rendering of a game or application is done on a server that is connected to the same local area network, wireless network and/or wireless connection as the user device on which the game/application generated images are displayed.

Some example embodiments actively alleviate the effects of at least four common rendering artifacts in real-time streamed graphics: latency, stutter, frame tearing and excess use of processing power. In conventional rendering techniques, one or more tradeoffs were made among these render artifacts. For example, some versions of the NVIDIA GeForceNow service, which enables users to play video games with very high quality and performance on many types of computers without requiring specialized gaming PCs by rendering the game on a powerful server in the cloud and streaming rendered image frames to the user's device, sacrificed latency and stutter by letting the server device render as fast as possible, and then at a fixed rate transmitting the latest available frame to the user. This technique has the disadvantage that there may be a frame-time worth or more of random stutter in addition to the incurred latency and/or wasted computation power on the server device.

In this disclosure the term "network rendering" is used to describe frame rendering being performed remotely from the computer and display device which displays the frame. Thus, network rendering includes cloud rendering or rendering by a server device located across a network such as the Internet, and also includes image rendering that is performed on a personal computer or game console that is locally, over a wireless network or connection, connected to VR goggles or other user device. One of the fundamental challenges of network rendering is that, whereas typically a processor generates images based on a vertical sync (VSYNC) signal synchronized to the connected display device's vertical blank or screen refresh signal, the rendering computer in a network rendering environment has no display to which it can VSYNC. The actual display device is on another system over a network, potentially hundreds of milliseconds away, and the generated images will be presented to the user a dozen frame times from the current time.

Example embodiments provide for the renderer (e.g., the rendering server) to VSYNC to a timer, and adjust the frame rate based on feedback from the actual display of the client device. The system observes whether the renderer is running faster or slower than the client device's display rate and, based on feedback from the client device regarding frame arrivals, adjusts the render frame rate. Some embodiments may also include a dampening filter, and the frame rate adjustment may be over-damped such that it takes multiple frames for the renderer to lock phases with the client display. Locking phases between the frame generation at the renderer and the display of the frame at the client display results in minimal latency, stutter and frame tearing. Example embodiments eliminate or reduce latency, stutter and frame tearing, while simultaneously eliminating dropped frames or at least limiting dropped frames to a predefined threshold. Additionally, by controlling image frame generation in the application to be more in line with the actual frame display requirements of the client device, situations such as the above mentioned excess frame generation as in some earlier version of the NVIDIA GeForceNow service is avoided, and more efficiency is obtained in power consumption.

System and Method for Rendering with Dynamic Jitter Tolerance

FIG. 1A illustrates a system 100 that provides network rendering of video with dynamic jitter tolerance, according to some example embodiments. A server device 102 provides services to one or more client devices such as client device 104. The services provided by server device 102 includes the running of an application 118 which renders frames that are transmitted over a network or communication connection 106 to client device 104, and video (and optionally audio) based on information from the frames is displayed on display device 108 of the client device 104. In an example embodiment, a user interacts with the application 118 using input device 109 and/or display 108 of client device 104.

Application 118 may be any application that can be run on a server device and displayed and interacted with by a client device. However, video games and the like in which streaming of gameplay images from the server device to the client device have more stringent performance demands in order to achieve satisfactory quality may show the most improvement due to the use of described embodiments. For example, a user wearing VR googles 148 while interacting with an application 118 that is a first person shooter game running on server device 102 will expect gameplay images to change/update almost instantaneously with movements of the goggles 148 and/or inputs on input device 109; a user interacting with a sports (e.g., a basketball) video game being run as the application 118 while using the personal computer (PC) 149 will expect the image on the display of the personal computer 149 to update almost immediately upon his/her key press regardless of whether the server is locally attached to PC 149 or is across a network; and a user interactively racing a car in a video game being run as the application 118 while using a game controller 147 will expect the image on the display device 108 to update almost immediately with the turning of the controller 147 regardless of whether the server is locally attached to PC 149 or is across a network or other communication connection.

The server device 102 may comprise one or more processors, and/or may include one or more interconnected computers. The server device 102 is, in some example embodiments, a computer that is more capable of application processing and real-time image rendering than the client device 104. The server device 102 includes at least one CPU 110 which executes application 118, and memory 116. Server device 102 may also include GPU 112 and a frame buffer 114. The CPU 110 may be a processor with any number of processing cores and cache memory. In scenarios where the application 118 is a video game, the image rendering may be performed by the GPU 112 and the images to be transmitted may be rendered to the frame buffer 114. Before transmitting the video frame to the network from the frame buffer 114, the video frame may be encoded using a codec such as, but not limited to, H264 or HEVC. During such encoding, particularly in VR applications, the compression rate for the codec may be set differently in respective regions of the image, based on the client display (e.g., head mounted device (HMD) lens parameters) or user gaze direction. In some embodiments, the server device 102 receives a camera pose (e.g., position and orientation) and a timestamp of when the pose was observed, and by keeping a history and knowing approximately when a video frame will be displayed to on the client device, the server device may extrapolate a new pose to render which may more closely match where the user is at the time of the actual displaying at the client device. In some embodiments, the GPU 112 may also be utilized for a substantial portion of intensive game processing. For example, GPU 112 may be switchable between graphics contexts in which image rendering is performed and compute contexts in which the substantial processing capability of modern GPUs can be used (in addition to or instead of CPU 110) for performing other processing which is not necessarily graphics. An example GPU 112 is described in FIG. 3.

A user interacts with the application 118 via the client device 104. In a streaming environment the client device 104 can, but is not required to, have the processing power to execute the game or other application with which its user is interacting. For example, in the above described scenarios, the games are being executed and the related gameplay images are being rendered on the server device, and frames containing the rendered gameplay information is transmitted over the network to the client device 104. The CPU 130 receives the image frames and using graphics driver 139 controls GPU 132 to render the received image frames to frame buffer 134 for display. The gameplay images are displayed to the user on the client device 104 display device 108. The user may provide interactive input to the application via input device 109 connected to client device 104. Whereas FIG. 1 shows an application 118 interacting with a client device 104, in accordance with various embodiments, application 118 may comprise one or more applications simultaneously running on server device 102 each of which interacts with one client device 104 or multiple client devices 104.

Since the client device is typically not required to do as intensive processing and/or rendering as the server device in a streaming scenario, the client may or may not contain substantially more than the capability to display the gameplay images and to obtain and transmit the user's interactive input to the server. In the illustrated example embodiment, the client device 104 includes a CPU 130 and memory 136. CPU 130 may include one or more processing cores. In streaming scenarios where the client device 104 receives image frames from the server device which runs the application and renders the imagery, the client device may operate to decode the received image frames and display them to the user. In some example embodiments, client device 104 may also include a GPU 132 and frame buffer 134. Frame buffers 114 and 134 are examples of the above mentioned display buffers. In some embodiments, the client may use the GPU to decode the frames received from the server before displaying. In some example embodiments, the client may also use GPU 132 to perform additional processing and/or rendering to supplement, enhance or otherwise modify the gameplay images. The images to be displayed to the display device 108 may be decoded and/or re-rendered to frame buffer 134 for display on display device 108. An example GPU 132 is described in FIG. 3. In some embodiments (e.g., in VR applications), the client device may also perform "late warp", which is warping the image based on the camera parameters for which the frame was rendered and the current camera parameters. For example, if the frame was rendered assuming the user was looking straight, just before displaying (e.g., after decompressing/decoding the received frame) the client device may, in some embodiments, warp the image to where the user is actually looking at. In contrast to conventional streaming applications in desktop VR and the like, the late warping in certain embodiments is applied after all processing relating to networking and video encode/decode, and just before displaying to the user on the client device's display.

Client device 104 may be, or may comprise of, one or more of a personal computer 149 (e.g. with display and keyboard), a pair of VR goggles 148, or a game controller 147 (e.g., with or without an integrated display). Alternatively, the client device 104 may be a smartphone, a tablet, a laptop or other mobile and/or wearable computing device. Client device 104 may alternatively be any other type of computing device that can display images from the server device and receive user interactive input to be transmitted to the server device. That is, for example, in respective example embodiments, the display device 108 and/or the input device 109 of the client device 104 may be incorporated in any of a game controller 147, VR goggles 148, PC 149 or other end user device capable of video display and of receiving user interactive input.

Display device 108 may be any type of display. The display may be a standalone display (e.g., standalone monitor, monitor of a personal computer), or may be incorporated into another device such as a game controller (e.g., controller 147, VR goggles 148, integrated computer or other types of client devices). According to some embodiments, the display device 108 may have a fixed refresh rate 60 fps-120 fps. The fixed refresh rate may be manually configurable. In some embodiments, the display device 108 may be operable with dynamically changeable refresh rates (e.g., adaptive refresh rates, NVIDIA's Gsync™, AMD's Freesync™), for example, in the 30-144 fps range. Display devices with refresh rates other than the ranges noted above are contemplated in some example embodiments. For example, although in general VR applications use fixed refresh rates required for low persistence displays, certain embodiments in VR and other applications support variable refresh rate displays that can adjust to server render times and/or network bandwidth.

Network or communication connection 106 (referred to hereafter simply as network 106) provides connectivity between server device 102 and client device 104. The network 106 may be the internet and/or may include any type of communication infrastructure such as one or more wide area networks, and/or one or more local area networks. Network 106 may comprise of one or more wired and/or one or more wireless networks. As described above, some example embodiments are directed to alleviate the end user visible effects of certain network anomalies such as jitter, and therefore, the use of those example embodiments in networks that more frequently give rise to some anomalies may provide more improved results than conventional streaming implementations. For example, although example embodiments are usable in a system in which the game console is connected via a high-quality cable to the VR headset, since it is unlikely that the one-hop connection made of high-quality wire from the game console to the goggles would cause jitter, the dynamic jitter control of the embodiments may not make a significant (e.g. noticeable) difference in performance or image quality. On the other hand, if the VR goggles is connected to the game console over a weak wireless communication connection, even a single-hop connection between the game console and client device may still exhibit jitter as some transmissions may be retransmitted once or more, and would exhibit better performance with example embodiments. When the network connection between the rendering server and the client device consists of multiple hops and/or multiple paths, and/or different types of network connectivity, the likelihood of the occurrence of jitter increases and example embodiments can be used to substantial advantage to eliminate or at least alleviate the effects of jitter. It should also be noted that, even if the network or connection between the rendering server and the client device is not prone to jitter, when the rendering server and the client device's display are not synchronized to a clock, there is likely to be a shift over time between them and the example embodiments can operate to ensure that the rendered images are displayed in an optimal manner.

Application 118, at least according to some embodiments, may be a video game. Server 102 executes the video game 118 in accordance with interactive inputs received from one or more users (e.g. game players or players), including the user of client device 104. Server 102 may include a frame timer 120. While executing the game 118, server 102 generates a stream of image frames that are subsequently displayed at the client device's display, such as display device 108. The CPU 110 and GPU 112 cooperate to generate and render the frames. The graphics driver 119 enables the CPU 110 to delegate image rendering and also other tasks involved in running application 118, to the GPU 112. In some embodiments, a frame timer 120 may be used to time generation and/or transmission of the image frames.

A feedback adaptive frame rate controller 122 at the server device 102 may operate to receive feedback from client device 104, and based on factors including the received feedback, to adjust frame timer 120 in order to control the render frame rate of video game 118.

Real networks have jitter, and packets may arrive at the destination with random delay. At the time of writing this disclosure, in GeForceNow, if an image frame arrives late at the display device, it is dropped and further stutter is introduced to the user. Instead, the system according to embodiments maintains a dynamic jitter buffer 138, characterized by the jitter absorption parameter (JAP) which defines how long frames spend in the jitter buffer on average. The client device 104 performs monitoring 142 of incoming image frame arrivals. The JAP 140, which controls the jitter buffer 138, may be configured based on the monitoring 142, If there is no jitter (and no jitter is expected), the JAP can be set to zero. If 99.99% of the frames have +/−5 ms arrival jitter, JAP can be set to 5 ms. Note that frames arriving early are not a problem, because they can be queued for subsequent display. The desired goal in some example embodiments is to have frames queued to display, instead of having frames arriving late and dropped.

The JAP may be set dynamically to adjust for varying network conditions. The value of JAP may be adjusted based on image frame arrival jitter measured at the client, and when it changes, the client device 104 may inform the rendering server 102 so that it can adjust the frame rate as required. In some embodiments, the rendering server 102 is notified every time the JAP changes at the client device. A logic similar to phase lock loop (PLL) logic may naturally fit this task. If the client determines that the JAP is to be increased, the render server is notified and the render server starts rendering faster. The frames then start arriving at the client device 104 at a faster rate than they are displayed, slowly filling the jitter buffer to a desirable amount. Conversely, if the jitter buffer is to be drained to minimize system latency, for a few moments the render server produces frames at a slower rate. In some example embodiments, the jitter buffer is not quantized to integer number of frames, but is time-based.

During game or other application 118 execution, frame arrival feedback 144 generated by frame arrival monitoring 142 is transmitted from client device 104 to server device 102. Interactive inputs 142 from the user, for example, from a keyboard, joystick, touchpad, head-mounted-display/goggles, motion sensors, accelerometers or the like, may also be transmitted from the client device 104 to server device 102. The server device 102 continues streaming frames image 146 at a frame rate that is adapted in accordance with the feedback 144 received.

Figure 1B:
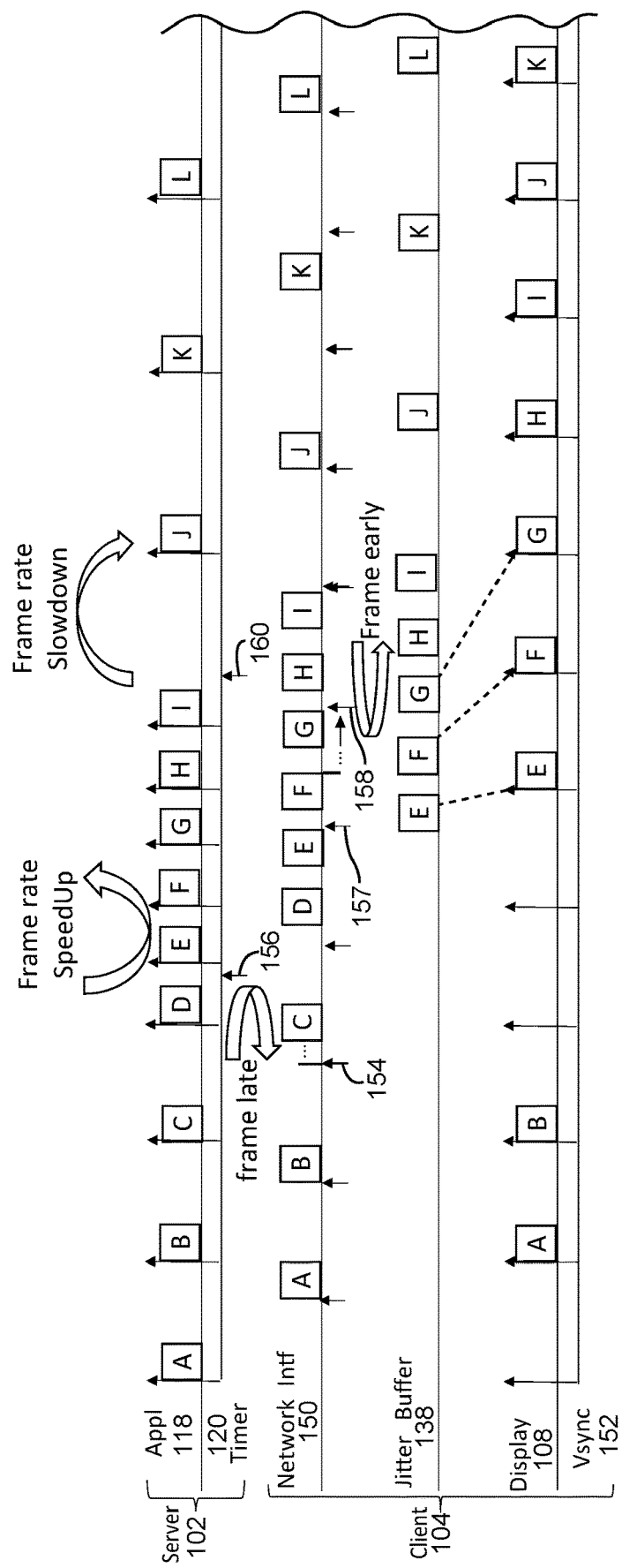

Example Server to Client Frame Sequence for Rendering with Dynamic Jitter Tolerance FIGS. 1B and 1C provide a schematic illustration of the relative timing relationships in frame transmission at a server device 102 executing an application and rendering images (e.g., game or other application 118) and the arrival of the rendered image frames at a client device 104 that displays the images from the received frames, according to some example embodiments. In the example shown, the application 118 on server device 102 is controlled by the frame timer 120 to transmit frames of images to client device 104 over a network (e.g., network 106), in a system environment such as that described in relation to FIG. 1A. The illustrated example also shows the corresponding frame arrival at the client device 104, and in particular, schematically shows the timing relationships as the image frames pass through the network interface 150, jitter buffer 138 and the display device 108 at the client device 104. The displaying of the arrived frames is shown with respect to the VSYNC signal 152 associated with the display device 108.

FIGS. 1B-1C show a sequence of image frames A-O generated by the application 118 running on server device 102. At the start of the illustrated example sequence, the server device's frame timer 120 is synchronized to the remote client device display VSYNC signal 152. As described above, the display device 108 continually refreshes the image displayed at regular refresh intervals corresponding to the VSYNC signal 152.

In contrast to the VSYNC 152 of the display device 108 which continues at a regular interval throughout the sequence of image frames A-O, the corresponding signal to the server device 102 as controlled by the frame timer 120 is changed continually and dynamically in response to network conditions to which the image frames are subjected to in transit from the server device 102 to client device 104. For this description, we may assume that the display refresh rate is constant at 60 fps, meaning that a VSYNC signal 152 is generated approximately every 16.67 ms at least throughout the sequence shown in FIGS. 1B-1C.

Initially, the server device's frame timer 120 is configured to fire at 60 fps to match the client device display 108 refresh rate. Accordingly, server device 102 generates and transmits frames A-D at regular intervals of approximately 16.67 ms. This initial setting may be based on a session setup negotiation between the server device and the client device when the streaming session is being established. The markers shown on FIG. 1B illustrating frame timer 120 firings on which frames A-D are generated and transmitted are evenly spaced indicating the interval of 16.67 ms between each successive pair of frames A-D. In some embodiments, the initial rate of the frame timer 120 may be slightly higher than the display refresh rate in order to build up the jitter buffer because the system may assume some non-zero jitter at startup.

After each frame A-D is transmitted from server device 102, after at least a certain duration that is defined by the propagation delay from the server device 102 to client device 104, the respective frames arrive at the network interface 150 of client device 104.

The regularly spaced markers placed immediately below the horizontal line for the network interface 150 illustrate the expected arrival time for each frame. The "expected arrival time" at the client device 104 is determined based on the client device's display device 108 and the associated VSYNC 152. That is, according to some embodiments, the expected arrival time may be the ideal time at which an image frame can be received at the client device 104 so that it can be displayed on display device 108 without being penalized by the need to buffer before displaying or being dropped due to late arrival. According to some other embodiments, the expected arrival time for a frame may be a point in time that is a predetermined duration before the corresponding VSYNC 152 at the client device such that the frame is not expected to spend more than a predetermined interval in the jitter buffer.

As shown in FIG. 1B, frames A and B are received at the network interface 150 at the respective expected arrival times, and are displayed on display device 108 upon the corresponding respective VSYNC signals 150.

Frame C, however, arrives at the network interface 150 of the client device 104 some interval after its expected arrival time 154. The client device 104, which continuously monitors frame arrivals, may generate a "frame late—speedup" message that is sent to the server device 102.

The "frame late—speedup" message is received at the server device 102 at point in time 156. Note that due to signal propagation delay on a network, the "frame late—speedup" message from the client device 104 to server device 102 is not received by the server device 102 until after some time interval from its transmission from the client device 104. Thus, in the example shown, although the client device 104 transmits the "frame late—speedup" message before the server device transmits frame D, the message is received (at point 156 in the time line) at the server device 102 only after frame D is transmitted in accordance with the original frame rate. Frame D too arrived at the client device 104 after its expected arrival time (shown by the expected arrival time marker occurring before frame D on network interface 150).

The late arrivals of frames C and D at the client device 104 may be caused by a transitory network condition such as changed routes, delays at intermediate nodes, or retransmissions, and illustrates the jitter that may be experienced by frames on the network between server device 102 and client device 104.

As shown in FIG. 1B, by arriving at the client device 104 after the respective expected arrival times, frames C and D are not ready to be displayed by display device 108 at the corresponding display VSYNC signals 152. Therefore, frames C and D are dropped without being displayed.

When no new frames are available for display the display device 108 may continue to display the previous image. This is an example of stutter due to frames arriving late.

In response to receiving the "frame late—speedup" message at point in time 156, the server device reconfigures its frame rate to speed up the frame generation and transmission.

As a result of the frame timer 120 speedup, as can be seen in FIG. 1B, frames E-I are transmitted by the server device 102 with shorter intervals between each pair of frames (i.e., at a rate greater than 60 fps).

As a result of frame E being transmitted at the faster rate, it arrives at the client device 104 before the expected arrival time 157 for frame E. This is shown in FIG. 1B with frame E arriving very shortly after frame D and before point in time 158 at the network interface 150.

Since frame E arrived early it is buffered in jitter buffer 138 before being displayed on display 108 in response to the corresponding VSYNC signal 152. Frame F is transmitted by the server device at the reconfigured faster rate, and arrives at the network interface well before the corresponding expected arrival time 158. It can be seen in FIG. 1B that the length of time by which frame E was earlier than its expected arrival time 157 is substantially shorter than the length of time by which the frame F is early with respect to its expected arrival time 158.

As can also be seen in FIG. 1B, each frame E-I arrives at the network interface 150 at progressively larger intervals before the respective expected arrival times and spends a progressively increasing amount of time in jitter buffer 138 before being displayed on display 108.

In the example shown, in response to receiving frame F, the client device 104 determines that F is received earlier than desired, for example, based on a determination that it arrived more than the predetermined time interval before the corresponding expected arrival time. Upon this determination, client device 104 notifies server device 102 to slowdown the frame rate. This notification may be issued by a "frame early—slowdown" message transmitted to the server device 102. The notification may be issued at point of time 158 or at any time between the arrival of frame F and the corresponding expected arrival time 158. In the example shown, the "frame early—slowdown" message is transmitted when frame F arrives at the network interface 150. The message is received at the server device at point of time 160. It should be observed that by the time 160 at which the "frame early—slowdown" is received, frame I has already been transmitted.

In response to receiving the "frame early—slowdown" message at 160, the server device 102 slows down the frame rate 120. For example, the frame rate may be slowed down from 120 fps at which frames E-I were transmitted, to a slower 30 fps, which is half the original frame rate at which frames A-D were transmitted.

The server device 102 transmits frames J-M at the slower frame rate. With the slower frame rate, each of the frames J-M arrives at the network interface 150 of the client device 104 at progressively shorter intervals before its corresponding expected arrival time. This is more clearly seen in FIG. 1B by observing the interval between the respective arrivals of frames J-M at the network interface 150 and their display on display 108.

The client device 104 is continuously monitoring arrival times of frames and comparing to the corresponding expected arrival times. When frame L is received at the network interface 150, the client device 104 determines that the length of time by which frame L is earlier than its expected arrival time 162 is within a predetermined threshold and notifies server device 102 that the arrival time is acceptable. This may be performed by transmitting a "frame normal" message to the server device 102, at any point between frame L's arrival and its expected arrival time 162.

The "frame normal" message is received by server device 102 at point in time 164, by which time it has already transmitted frame M. In response to receiving the "frame normal" message, the server device 102 determines to revert to its original rate. For example, the server device 102 reconfigures its frame rate from 30 fps to 60 fps.

Therefore, frames N, O and successive frames (not shown) are transmitted at the original frame rate until the server device 102 again receives a notification from the client device 104 to change the frame rate 120.

FIGS. 1B-1C show image frame transmissions and arrivals. However, in some embodiments, each image frame is transmitted as a plurality of packets. With respect to the illustration in FIGS. 1B-1C, the interval between two successive image frame arrivals illustrates the duration between the arrival of the last packet of the earlier frame and the arrival of the first packet of the later frame.

Example Client Device Processes for Rendering with Dynamic Jitter Tolerance

Figure 2A:
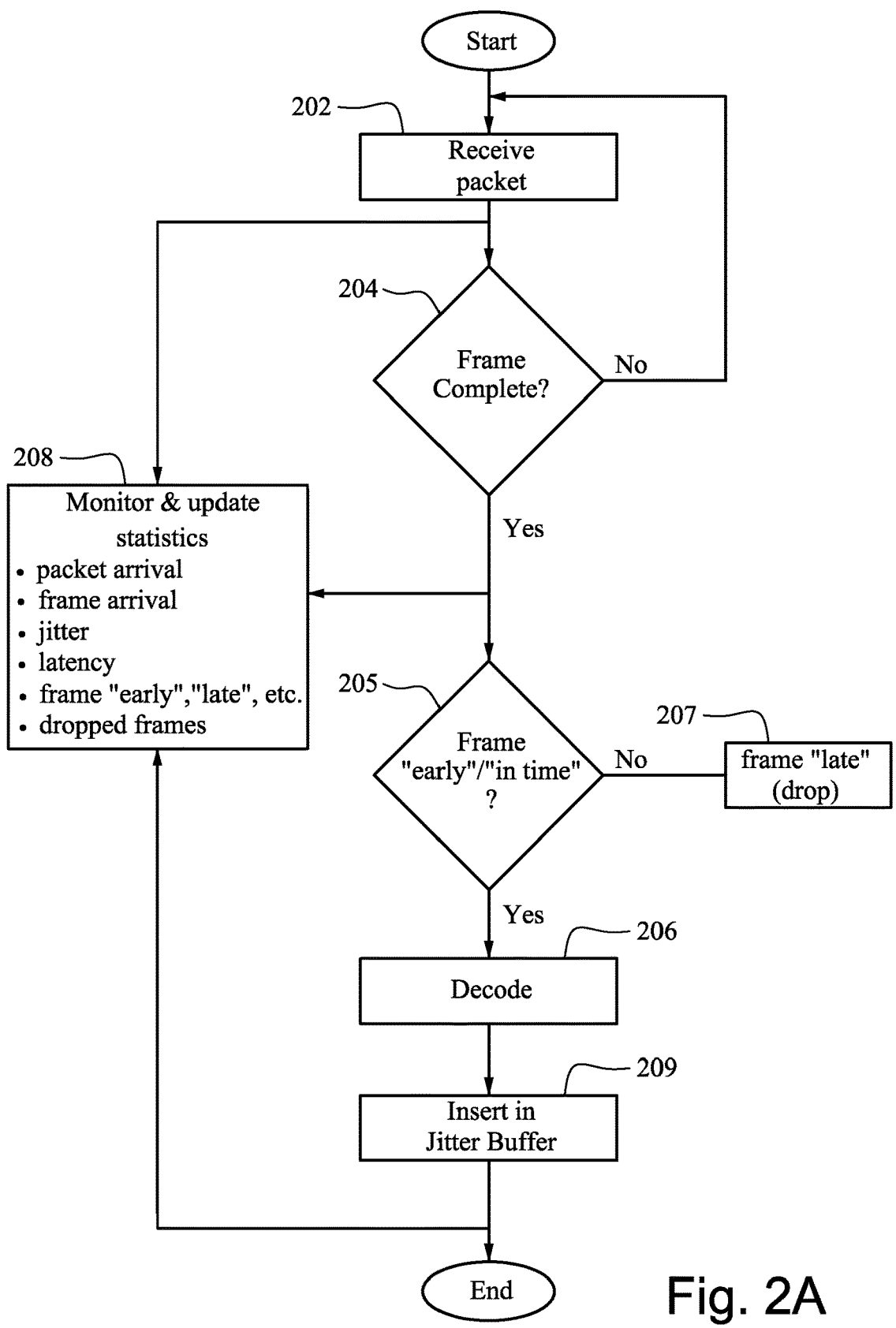
FIG. 2A is a flowchart of an example process performed by the client to perform jitter-tolerant displaying of video frames received from the server and to monitor frame arrival statistics, according to some example embodiments.

FIG. 2A is a flowchart of an example process 200 performed by the client device 104 to perform jitter-tolerant displaying of video frames received from the server device 102 and to monitor frame arrival statistics, according to some example embodiments.

After entering process 200, at operations 202 and 204, the client device receives respective packets of an image frame until the image frame is complete. The embodiments are not limited to any particular image frame format and/or packet format. An image frame comprises image information for displaying a complete image on a display screen. According to some embodiments, an image frame may also include audio information and/or other data. Each image frame may be transmitted using one or more packets. According to some embodiments, the image information is encoded in H.264 format. The use of other encoding formats, such as, for example, High Efficiency Video Coding (HEVC), or other MPEG format etc., are possible in alternative embodiments. The packets may be transmitted as Internet Protocol (IP) packets and may use the User Datagram Protocol (UDP) or Transmission Control Protocol (TCP) as the transport protocol. In some embodiments, the Real Time Transport protocol (RTP) and Real Time Transport Control protocol (RTCP) are used as a session protocol to encapsulate H.264 (or other) video image information payloads.

In some embodiments, receiving and assembling an image frame may include detecting missing or corrupted packets and requesting retransmission of such missing packets. However, relying on retransmissions to correct packet errors may not be practical in certain video streaming systems, such as, for example, when the end-to-end latency for packets is high. Thus, in some other embodiments, the packets may additionally or alternatively include error correction information (e.g., forward error correction) such that transmission errors can be corrected at the receiver based on the included forward error correction information. Operations 202 and 204 may also have, associated with them, the collection of statistics for packet arrivals (e.g., arrival times for respective packets of a frame) and frame arrivals. In some embodiments, a frame's arrival time may be considered to be the time that all packets of that frame are received, or the time at which that frame's assembly is completed.

When the client device 104 determines that a complete image frame has been received, at operation 205 it is determined whether the latest frame is "early", "in time" or "late" with respect to a corresponding expected arrival time or time interval.

As described above in relation to FIGS. 1B-1C, in some embodiments, the client device has an expected arrival time for each respective image frame. In respective embodiments the expected arrival time of a frame may be defined as the corresponding VSYNC signal, an ideal time before the occurrence of the corresponding VSYNC with just enough time to process the received image frame and display without initially putting the image frame in the jitter buffer, or a point in time that is a predetermined duration before the corresponding VSYNC at the client device such that the frame is not expected to spend more than a predetermined interval in the jitter buffer. If the frame arrived before the expected arrival time, it is considered early; if it arrived within the expected arrival time interval, it is considered in time; and, if it arrived after the expected arrival time and time interval, then it is considered late.

If the image frame is late, then the frame may not be ready to be drawn on the corresponding refresh of the display device and therefore the frame is dropped at operation 207. In some embodiments, the late arriving frame is only dropped if there is a newly arrived frame before the current frame is picked up for scanout to the display.

If the image frame is not dropped due to being late (e.g., it is early or in-time), then at operation 206 the image frame is decoded. The decoding includes converting (if necessary) the format of the image frame to a form that can be displayed on the client device display, content protection processing, decompressing etc. Performing the decoding before the image frame is placed in the jitter buffer may help ensure that all of the potential jitter-causing processing (i.e. the decoding times may vary among frames, typically based on factors such as complexity of the image encoded in the frame) is performed before the jitter buffer. That is, in such embodiments, what is written to the jitter buffer are decoded image frames. In such embodiments, the frames in the jitter buffer are already decoded and ready for scan-out. Also, in such embodiments, the frame arrival times collected at operation 208 (described above) may include the time consumed for decoding the respective image frames.

Figure 2B:
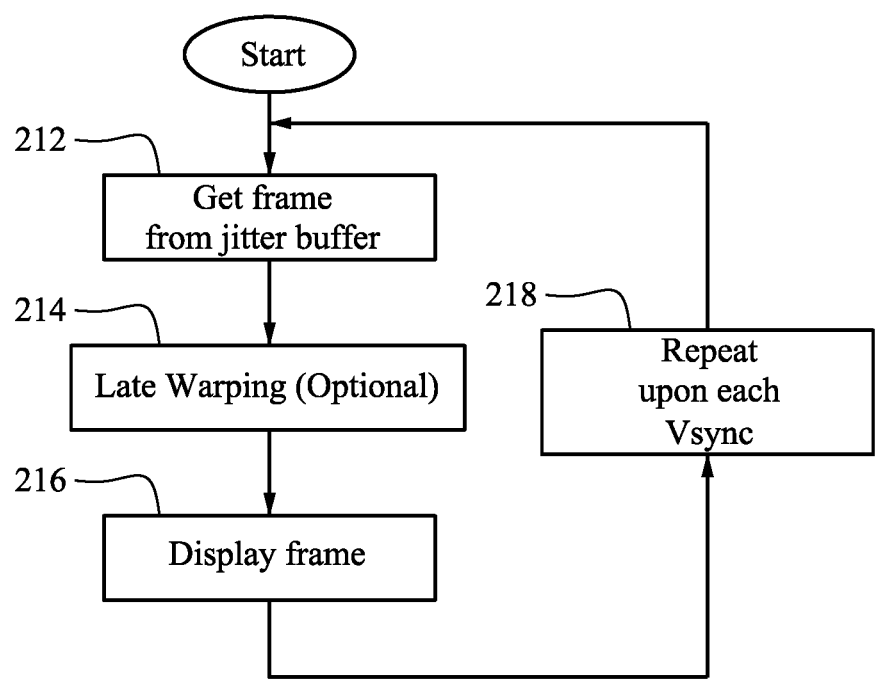
FIG. 2B is a flowchart of an example process performed by the client to display image frames received from the server, according to some example embodiments.

Although shown as an operation on the image frame before the jitter buffer in the embodiment illustrated in FIG. 2A-2B, in some other embodiments, the decoding operation 206 may be performed following the image frame being retrieved from the jitter buffer.

After the decoding, at operation 209 the decoded image frame is inserted in the jitter buffer. As noted above, in some alternative embodiments, the frame inserted in the jitter buffer may not be a decoded image frame. In some embodiments, the jitter buffer may be a particular area in memory of the client device 104, and inserting an image frame in the jitter buffer includes writing that image frame into that particular area of the memory. For example, the jitter buffer may be a queue or other first-in-first out (FIFO) data structure in memory to which image frames are written after being assembled, and from which image frames are written to the display buffer for displaying on a display screen. Monitoring statistics, such as, for example, the number of frames, the entry time of respective frames into the jitter buffer and the exit time of respective frames from the jitter buffer may be associated with the jitter buffer.

In some other embodiments, the jitter buffer is the total time an image frame is, after being assembled from received packets, in the memory of the client device before being written into a display buffer and/or being displayed on a display device. The memory which is used to implement the jitter buffer may be the client device's random access memory and/or another memory (other than the display buffer) associated with the client device's GPU. That is, the client device may implement a jitter buffer by any data structure and technique to keep track of the respective image frames that are in a memory pending being written into a display buffer, and how long the respective image frames are in memory.

Subsequently, image frames from read from the jitter buffer and displayed on the display device by a process such as process 210 shown in FIG. 2B.

At operation 208, statistics regarding the time spent by frames in the jitter buffer are collected. For example, upon the insertion of an image frame into the jitter buffer, a number of frames in the buffer may be incremented, and an entry time for that frame may be recorded. Upon exit of that image frame from the jitter buffer, the number of frames may be decremented, the exit time may be recorded, and/or the time spent by the frame in the jitter buffer is calculated based on that frame's entry and exit times.

In some embodiments, the jitter buffer levels are determined based on the pending times for which respective image frames are held in the jitter buffer before being written to the display buffer. That is, the jitter buffer level is determined based on the times spent by respective frames in the jitter buffer. In some other embodiments, the jitter buffer levels may be determined based on other criteria, such as, for example, the number of frames in the jitter buffer. Embodiments may not require that the jitter buffer holds or is capable of holding a discrete number of frames. In some embodiments, the jitter buffer may be only a fraction of a frame time (e.g., a fraction of the time it takes to write a frame to memory).

As described above, operation 208 records packet/frame arrival statistics that are collected in relation to operations 202-204. Additionally, operation 208 may also collect information regarding whether the respective frames arrived early, in time or late with respect to their respectively corresponding expected arrival times. The information collected at operation 208 may also include a count of the dropped frames.

FIG. 2B illustrates a flowchart of an example process 210 performed by the client device to display image frames received from the server device, according to some example embodiments.

Process 210 may continually run to display images on the display of the client device. According to some embodiments, process 210 is run for each refresh time or in synchronization with the vertical blanking signal of the client device's display. In some example embodiments, the client device or the client device's GPU receives a VSYNC signal that is closely synchronized to the connected or integrated display's vertical blanking signal. As shown in operation 218, process 210 is repeated for each received VSYNC.

After process 210 is entered, at operation 212, an image frame is read from the jitter buffer. The image frame that has been in the buffer the longest is read. This is in accordance with the FIFO behavior of the jitter buffer. In alternative embodiments, in addition to or as an alternative to the time the frame was in the jitter buffer, other criteria (e.g., type of image frame, etc.) for selecting the image frame to read may be used. Note that, as shown in FIG. 2A, when a frame is retrieved from the jitter buffer, corresponding frame arrival statistics are updated in the above described operation 208.

At operation 214, in some embodiments, an optional processing step of late warping may be performed on some of the image frames before they are displayed. As described above, late warping is the warping of the image in the image frame that is performed after the decompress/decode steps. Late warping may be used to further adjust the image frame, which is already rendered by the server device in accordance with the user or client device's pose obtained at the time of the corresponding user input, to even more closely correspond to the latest user view point. In some embodiments, late warping may not be performed, and the processing in process 210 may proceed to operation 216 after operation 212 without an intervening late warping operation 214 being performed.

At operation 216, the image frame retrieved from the jitter buffer is sent to the display device for display. This includes writing the image frame to a frame buffer for display by the display device. In some example embodiment, the image frame data in the frame buffer is read line by line from the top left of the screen and displayed. For example, in some embodiments, each line is drawn in response to the horizontal blanking (HBLANK) signal of the display. Upon completing the drawing of the image frame on the display device, the display device generates a vertical blanking (VBLANK) signal to begin drawing the next image frame on the display device. The VSYNC to the client device and/or GPU may be closely synchronized to the display device's VBLANK. The synchronization of the client device's or its GPUs VSYNC with the directly connected or integrated display device's VBLANK may be based upon any conventional technique.

In some example embodiments, frame buffers are arranged in pairs. In such embodiments, when one frame buffer is being read by the display device for displaying, the next image frame may be written into the other frame buffer. Upon each successive VSYNC signal, the display device reads alternate frame buffers for drawing on the display device.

At operation 218, in response to the next VSYNC, operations 212-216 are repeated to display the next image frame.

Figure 2C:
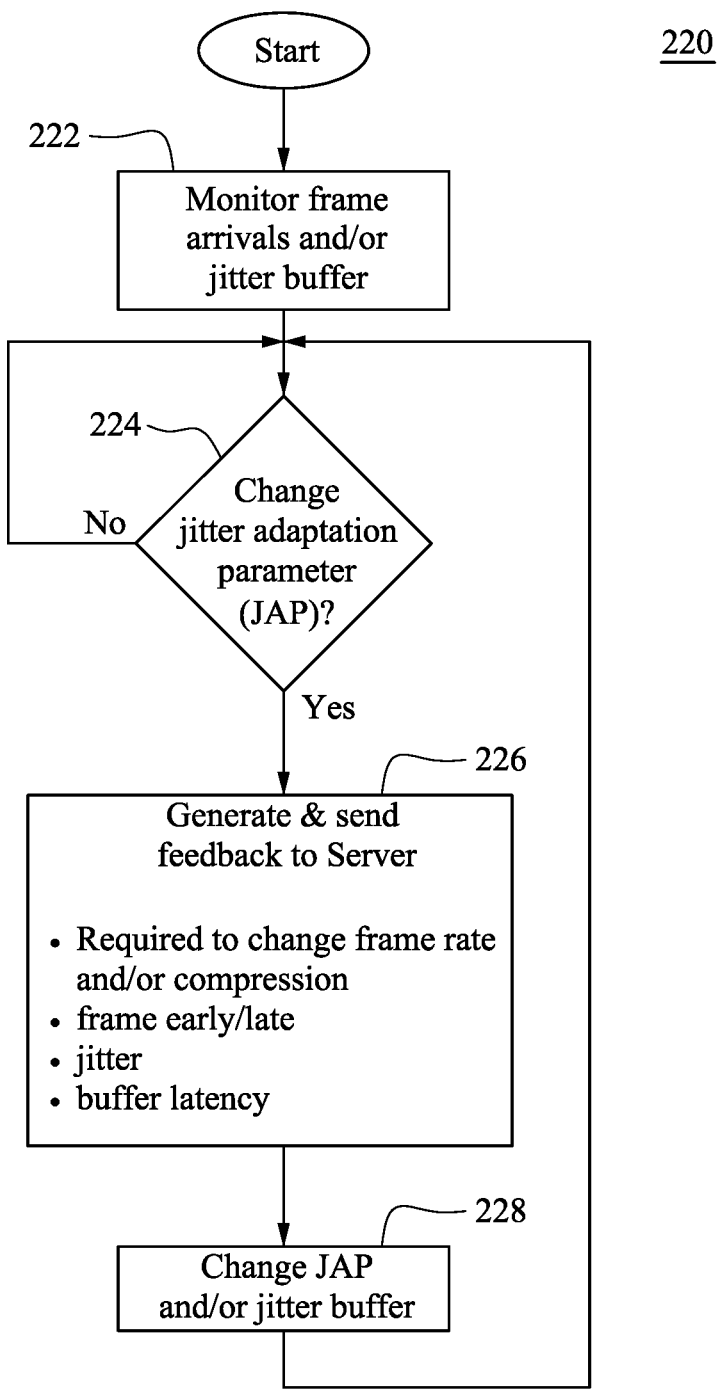
FIG. 2C is a flowchart of an example process performed by the client to dynamically adjust jitter adaptation parameter and to provide feedback to the server, according to some example embodiments.

FIG. 2C illustrates a flowchart of an example process 220 performed by the client device to dynamically adjust the jitter adaptation parameter and to provide feedback to the server, according to some example embodiments. According to an embodiment, process 220 may be performed as part of, or in association with, operation 208 shown in FIG. 2A.

At operation 222, the client device monitors packet/frame arrivals and/or jitter buffer as described above in relation to operation 208. The monitoring may include keeping track of the interval between successive packet/frame arrivals at the client device, the time spent by respective frames in the jitter buffer, and determining the time of arrival of respective frames with respect to corresponding expected arrival times.

At operation 224, determine whether the jitter adaptation parameter, referred to as JAP, needs to be changed. As described above, the JAP represents a size of the jitter buffer—in terms of time. In some embodiments, the determination whether to change the JAP may be dependent on whether the level of the jitter buffer has changed exceeding a time threshold for JAP reconfiguration. This difference can be determined by comparing the current level of the jitter buffer and the current value of the JAP.

In some embodiments the current level of the jitter buffer is defined by the amount of time spent in the jitter buffer by the latest image frame retrieved from the jitter buffer. In some other embodiments, the current level of the jitter buffer is defined by an average of times spent in the jitter buffer by respective frames. For example, the average may be a weighted average more heavily weighted to the latest or a predetermined number of the latest retrieved frames. In one example embodiment, the level is defined by a weighted average in which the latest frame is assigned nine tenths of the weight and the last value of the JAP assigned one tenth of the weight. It should be noted that embodiments are not limited to any particular distribution of assigned weights. In some embodiments, a difference of about 20 ms between the current level of the jitter buffer and the current value of the JAP may be used to cause changing the JAP.

The time threshold for JAP reconfiguration may be hard-coded or may be provided as a configurable parameter.

If the determination at operation 224 indicates that JAP is not be changed, the process 220 repeats operation 224 until the statistics cause the determination that JAP is to be changed. When it is determined that the JAP is to be changed, the processing proceeds to operation 226.

At operation 226, feedback is transmitted to the server device. The transmitted feedback may include any of: information regarding one or more of the immediately preceding frames arriving early, in time or late in relation to the expected arrival time (e.g., whether frame arrived early or late and, optionally, by what duration); information regarding inter-arrival times of respective frames (e.g., average frame inter-arrival time, jitter, minimum frame inter-arrival time, maximum frame inter-arrival time); information regarding arrival of packets of one or more frames (e.g., average packet inter-arrival time for a frame); and information regarding the jitter buffer latency (e.g., average time spent by frames in the jitter buffer, time spent in the jitter buffer by the last frame).

At operation 228, the value of the JAP is changed based on the current value of the jitter buffer. In some embodiments, the JAP is changed to be equal to the current level of the jitter buffer as determined at operation 224. At operation 228, if necessary, the data structure of the jitter buffer may also be changed in accordance with the new JAP value. In some embodiments, there may be no need to change the jitter buffer data structure every time the JAP changed. For example, the data structure may be capable of accommodating any number of frames that arrive early and may only be limited by the availability of memory.

Example Server Device Processes for Rendering with Dynamic Jitter Tolerance

Figure 2D:
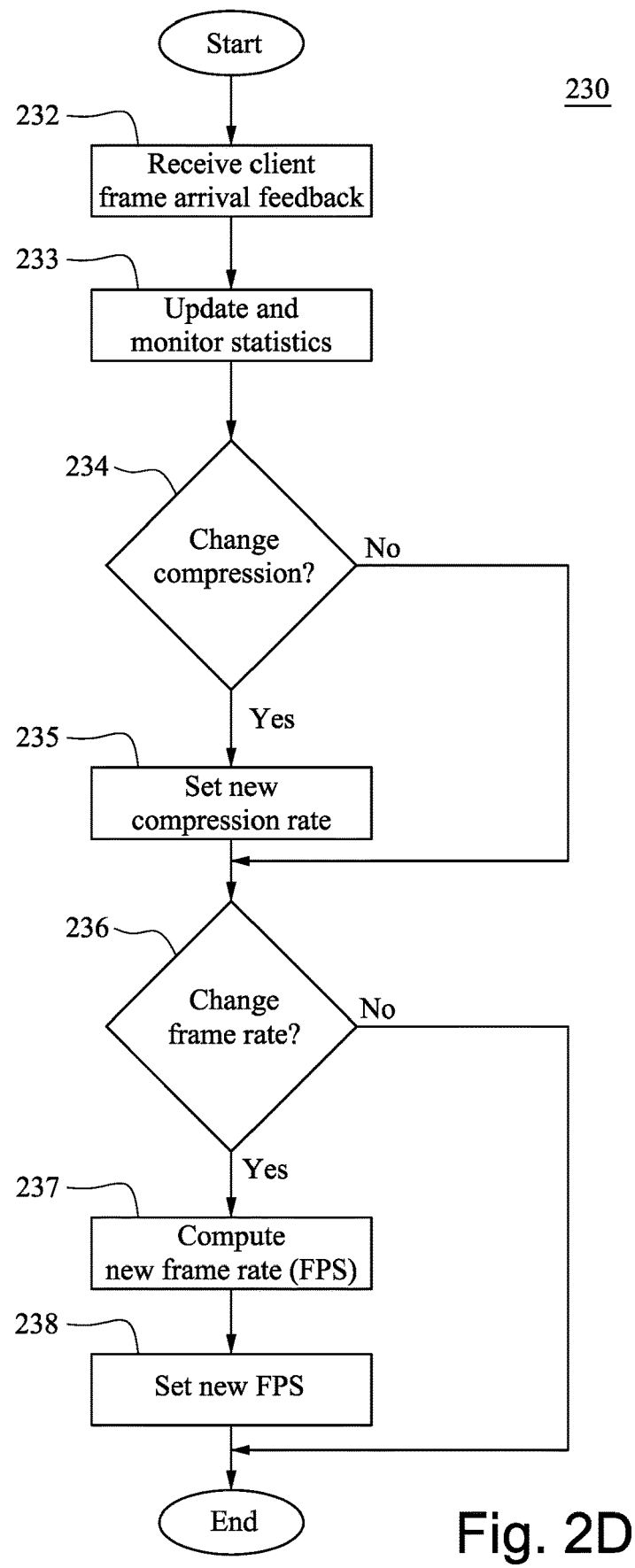
FIG. 2D is a flowchart of an example process performed by a server computing device to adapt the frame rate for image frames generated from a game or other application executing on the server, according to some example embodiments.

FIG. 2D shows a flowchart of an example process 230 performed by a server computing device such as server device 102 to adapt the frame rate for image frames generated from a game or other application executing on the server, according to some example embodiments. In some embodiments, the server device 102 may perform process 230 in response to messages received from a client device 104 that executes processes 200, 210 and 220 shown in FIGS. 2A-2C.

At operation 232, one or more feedback messages from the client device are received. As noted in relation to operation 226, the feedback may include any of: information regarding one or more of the immediately preceding frames arriving early, in time or late in relation to the expected arrival time (e.g., whether frame arrived early or late and, optionally, by what duration); information regarding inter-arrival times of respective frames (e.g., average frame inter-arrival time, jitter, minimum frame inter-arrival time, maximum frame inter-arrival time); information regarding arrival of packets of one or more frames (e.g., average packet inter-arrival time for a frame); and information regarding the jitter buffer latency (e.g., average time spent by frames in the jitter buffer, time spent in the jitter buffer by the last frame). In some example embodiments, the feedback messages may include a floating point number indicative of whether the frame rate at the server device must be made faster or slower and also by how much. For example, the specified number may be a positive or negative number indicating faster or slower, respectively. If the number is 0, then the client device is indicating that the frame rate is suitable for the client device display.

At operation 233, selected statistics are monitored and updated based on the received feedback. The received feedback message information is incorporated in the tracked statistics. In some example embodiments, the new feedback and the tracked statistics are combined in a weighted manner, with a higher weight assigned to the new feedback.

At operation 234, it is determined if the compression rate should be changed. In the embodiments currently being described with respect to the FIGS. 2A-2E, the client device transmits the feedback or feedback messages marked in a particular manner when it determines that a substantial change should be made to the JAP. Thus, at operation 234, basically the server device determines whether the jitter changes detected at the client device are due to bandwidth scarcity or another reason. If the determination is made that bandwidth scarcity is a current issue, then the server device may determine to increase the compression rate for the image frames and make the frames smaller.

The determination whether there exists a current bandwidth scarcity is based on an estimation made from the packet arrival information included in the feedback received from the client device. If any one or each of the one or more preceding frames for which the feedback information includes packet arrival statistics indicate, that all the packets for a frame were received in substantially the entire estimated frame transmission time or exceeding the entire estimated frame transmission time, then the server device may determine that a current condition of bandwidth scarcity exists then it may increase compression.

If it is not determined that a scarcity of bandwidth exists currently, or after setting a new compression rate, process 230 proceeds to operation 236. At operation 236 it is determined whether to change the frame rate.

The determination as to whether or not to change the frame rate at the server device is based on the latest feedback received from the client device. In many situations, when the client device indicates that the one or more preceding frames were received at the client device early, then the server device may decide to reconfigure the frame rate to be slower. When the client device indicates that one or more of the frames were late, then the frame rate is reconfigured to be faster. When the client indicates that the frames arrived in time, then the server device does not reconfigure the frame rate.

At operation 237, calculate a new frame rate based on the feedback received from the client device. The new frame rate may be associated with a projected acceptable amount of dropped frames—for example, specified as an acceptable dropped frame rate. For example, in some embodiments, an approximation to the cumulative distribution function of jitter is computed and the target JAP is set at a desired percentage (e.g. 99.9%) of that. In an example embodiment, the raw new frame rate raw-fps$_{new}$ (new raw frames per second rate, before applying weights) can be calculated as shown in equation (1), based on the current frame rate, target JAP and the current level of the jitter buffer:

$$\text{raw-fps}_{new} = \text{raw\_fps}_{current} * (1 + k_1 * (\text{JAP}_{target} - \text{jitter-buffer-level}_{current})) \quad (1)$$

where $k_1$ is a configurable constant and controls (at least partially) how fast the target JAP is reached. For example, higher $k_1$ values result in reaching the target JAP faster that lower $k_1$ values. The final frame rate fps$_{new}$, that is the actual frame rate to which the server frame rate will be adjusted, can then be calculated from the raw-fps$_{new}$ as shown in equation (2) below, $$fps_{new}=fps_{current}*k_2+\text{raw-fps}_{new}*(1-k_2) \quad (2)$$

where $k_2$ is a configurable constant that is adjustable to vary the weight assigned to the current frame rate. For example, setting $k_2$ to 0.1 in (2) will result in a weighted server frame rate (fps$_{new}$) that is based on 10 percent of the weight assigned to the current frame rate and 90 percent of the weight assigned to the newly determined raw frame rate.

At operation 238, set the frame rate to the calculated rate. The frame rate may be set by changing the interval for the VSYNC or another signal to the GPU and also to other processors such as the CPU generating the frames. In some embodiments, the frame rate is changed by changing a frame timer 120 which may generate a signal (e.g., interrupt or other signal) at least to CPU 110 and optionally also to the GPU 112. As described below win relation to FIGS. 2E and 2F, the frame generation may be initiated by the CPU 110 which can command the GPU 112 to perform tasks associated with the generation and encoding of the image frames.

Figure 2E:
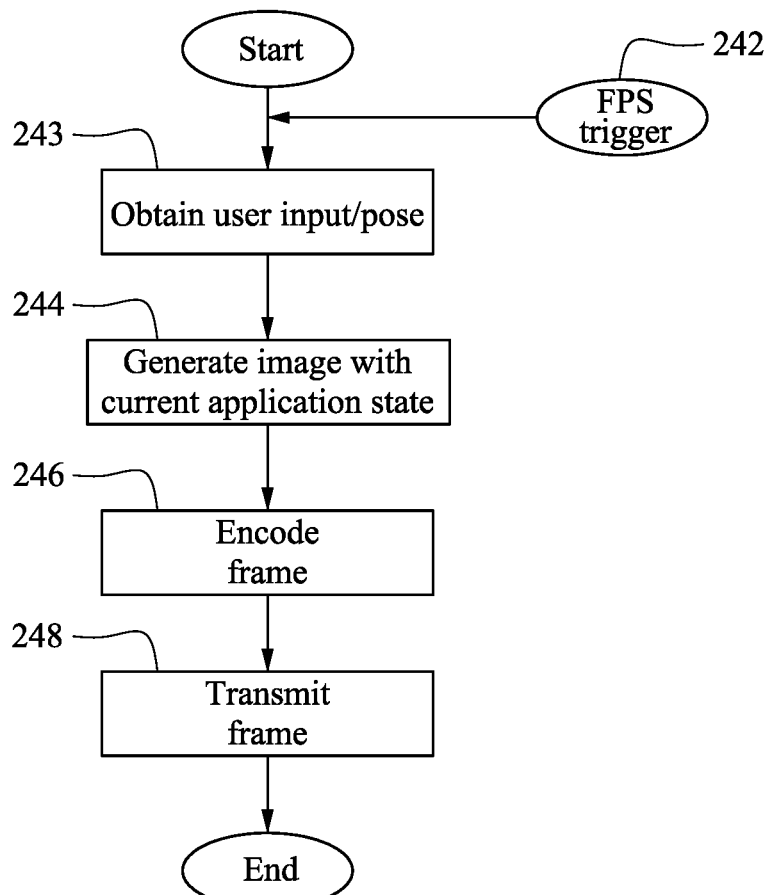
FIG. 2E is a flowchart of an example process for generating an transmitting image frames at the frame rate determined according to FIG. 2D, according to some example embodiments.

FIG. 2E shows a flowchart of an example process 240 for generating and transmitting image frames at the frame rate determined according to FIG. 2D, according to some example embodiments. Process 240 may be initiated as a result of a negotiated between the server device 102 and client device 104 setting up a video streaming session. As illustrated, process 240 may be repeated each time a trigger is received 242 based on the current frame rate. The process 230, which was described above, enables a server device, such as server device 102, to dynamically set the frame rate in response to frame arrival feedback received from the client.

At operation 243, the latest user interactive input and/or pose information received at the server device from the client device is obtained. In this manner, the image frame to be transmitted can represent the current game or application state with respect to the latest available user information (e.g., user's pose/view direction and/or latest input to the game or other application). Note that the game or other application processing at the server device 102 may proceed separately from processes 230 and 240, based on user interactive inputs 142 received from the client device.

At operation 244, an image is generated in accordance with the current game or other application state and the latest available user information. Any technique may be used to capture the current game or other application state and generated the image.

At operation 246, the generated frame is encoded. As described above, an H.264 or other image format suitable for game or other application streaming may be used. According to some embodiments, the encoded image frame contains image information for displaying one display screen. The encoding may be performed according to image format parameters and protocol parameters negotiated, either at session setup time and/or dynamically during the session, between the encoder in the server device and the decoder at the client device.

At operation 248, the encoded image frame is transmitted. The image frame may be transmitted in one or more packets. As described above, according to some embodiments, the image frame information and optionally associated audio information may be included in several packets that each include protocol header information for protocols such as H.264, RTP/RTCP, and TCP/UDP.

Example Rendering Pipeline for Rendering with Dynamic Jitter Tolerance

Figure 2F:
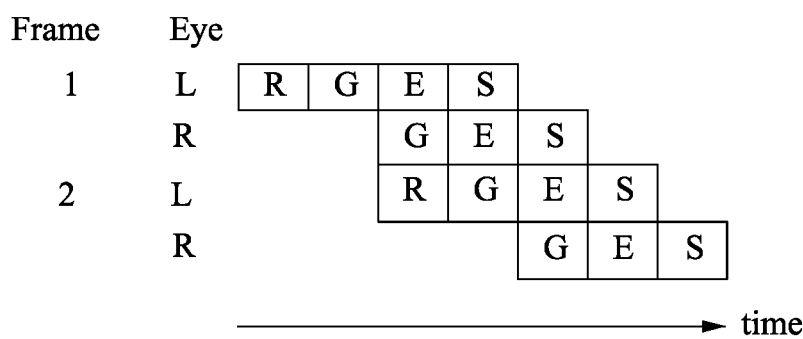
FIG. 2F illustrates an example processing pipeline according to some example embodiments.

FIG. 2F shows an example pipelined generation and transmission process such as process 240. The figure illustrates a four stage pipeline, which enables the CPU and GPU at the server to perform work on multiple frames in parallel for drawing on a stereoscopic display such as the goggles 148 or other display. The four stages are a receive stage such as operation 243, a generation state such as operation 244, an encoding stage such as operation 246 and a transmit stage such as operation 248. These stages are represented in the pipelines shown in the figure as "R", "G", "E" and "S", respectively. In some embodiments, the generate and encode pipeline stages may be performed by the GPU in accordance with commands from the CPU. The receive and transmit pipeline stages are typically performed by the CPU. In the illustration, in response to each trigger 242 based on the frame rate, a left eye ("L") frame and a corresponding right eye ("R") frame are generated for the frame time. The user input or pose information obtained in a particular receive stage is used for generating the left eye frame and also the right eye frame. As illustrated, the pipeline enables respective stages of the left eye frame and the right eye frame, and also for respective stages of two frames (e.g., frames 1 and 2 in the figure), to be performed in parallel.

The illustration in FIG. 2F is with respect to a four stage pipeline. However, some embodiments may have pipelines with a lesser or greater number of stages of processing that can be performed simultaneously by various processing components such as the CPU, GPU and/or various specialized or acceleration processors. As described below in relation to FIGS. 3-7, the GPU in some embodiments is a massively parallel processing unit.

Although methods 210, 220, 230 and 240 are described in the context of a processing unit and certain hardware components, the methods 210, 220, 230 and 240 may also be performed by custom circuitry, or by a combination of custom circuitry and a program. For example, the methods 210, 220, 230 and 240 may be executed by a GPU (graphics processing unit) or any one or more processors capable of the operations of methods 210, 220, 230 and 240. Furthermore, persons of ordinary skill in the art will understand that any system that performs methods 210, 220, 230 and 240 is within the scope and spirit of embodiments of the present invention.

A Parallel Processing Architecture for Dynamic Jitter Tolerance

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Although the jitter tolerant video rendering system 100 is described in the context of processing units, one or more of the units 118, 119, 120, 122, 138, 139, 140, and 142 may be implemented as a program, custom circuitry, or by a combination of custom circuitry and a program. For example, the units 122 and 142 may be implemented by a GPU (graphics processing unit), CPU (central processing unit), or any processor capable of implementing layers of a neural network. Furthermore, persons of ordinary skill in the art will understand that any system that performs the operations of the jitter tolerant video rendering system 100 is within the scope and spirit of embodiments of the present invention.

Figure 3:
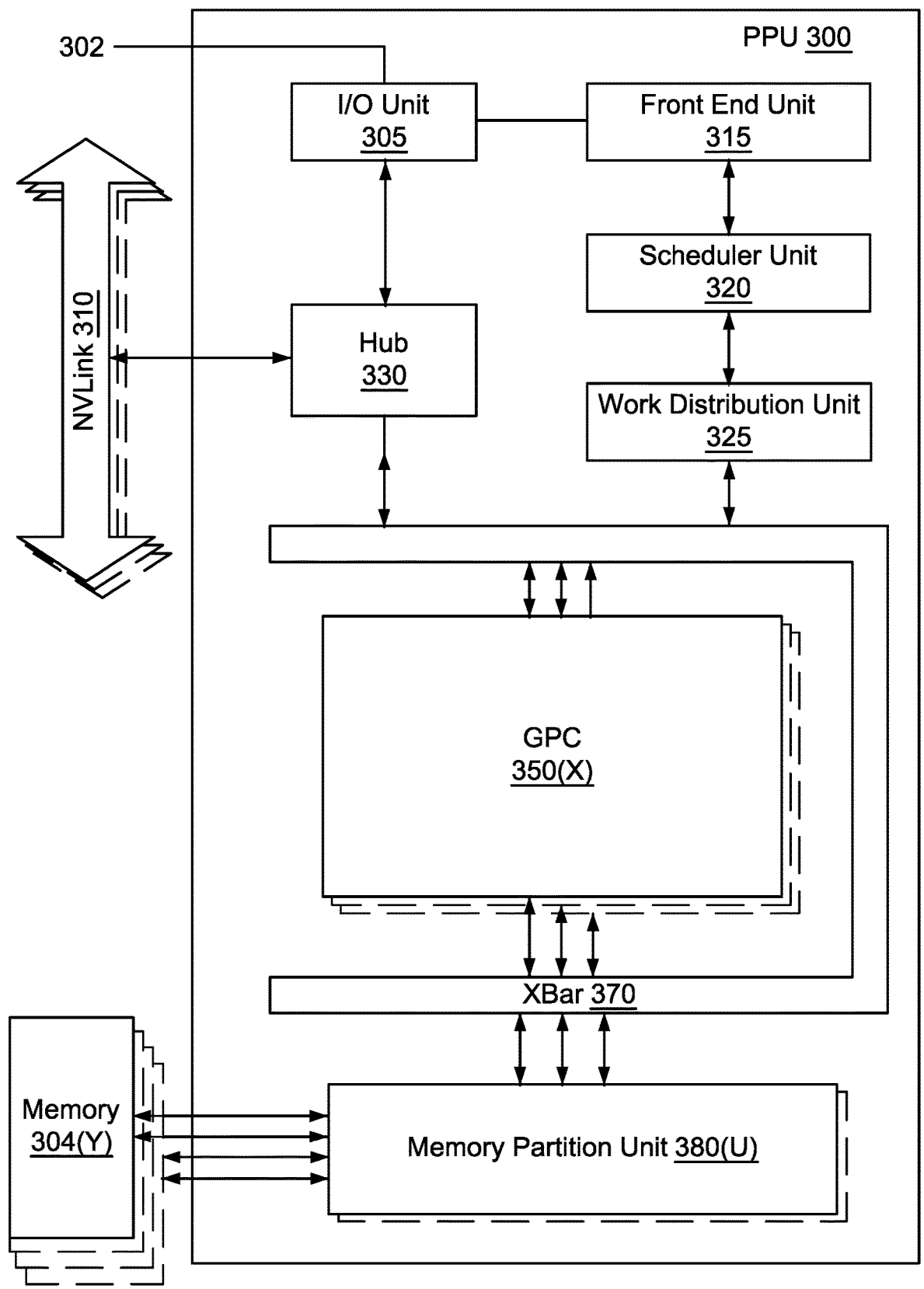
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more of the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
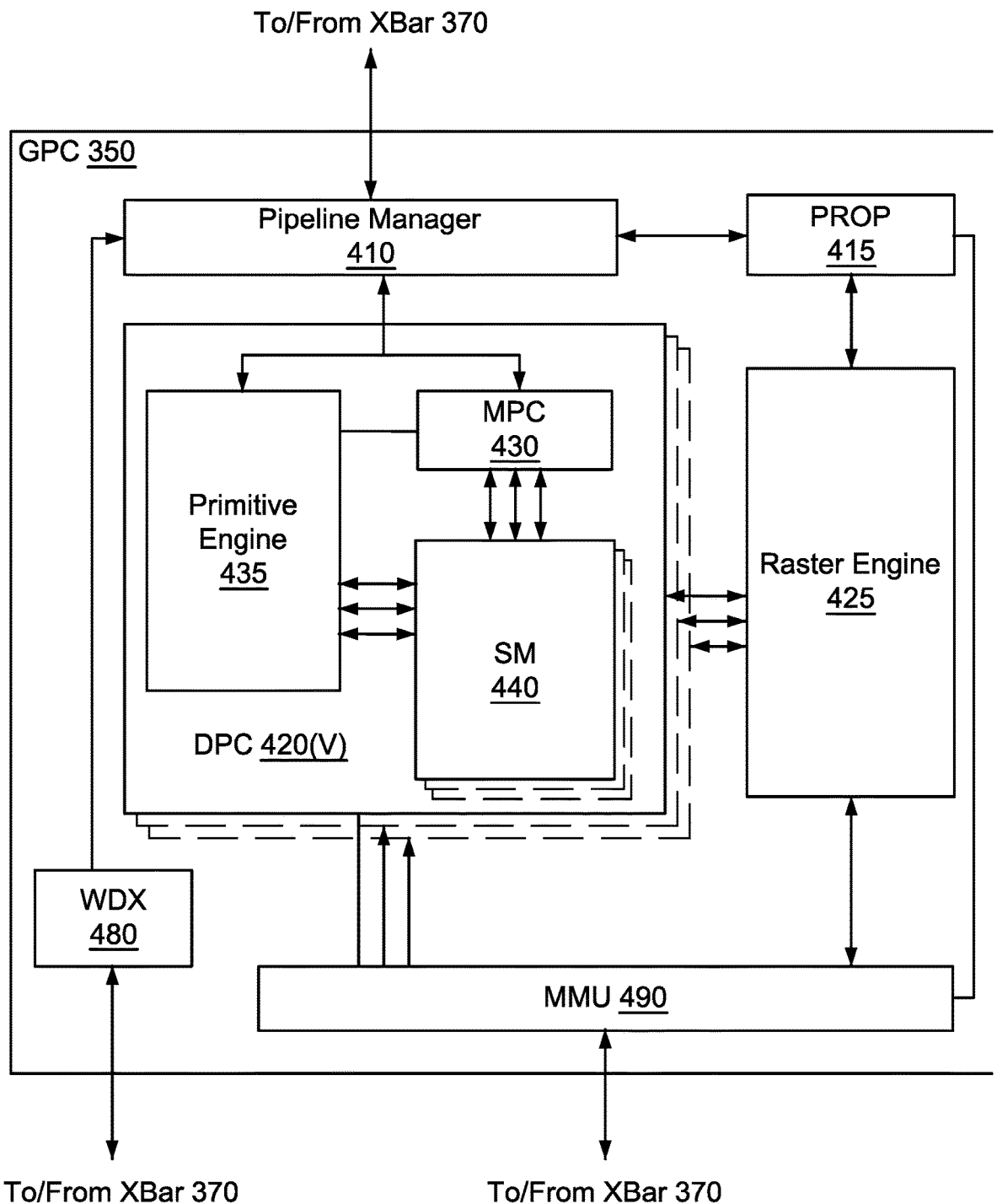
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
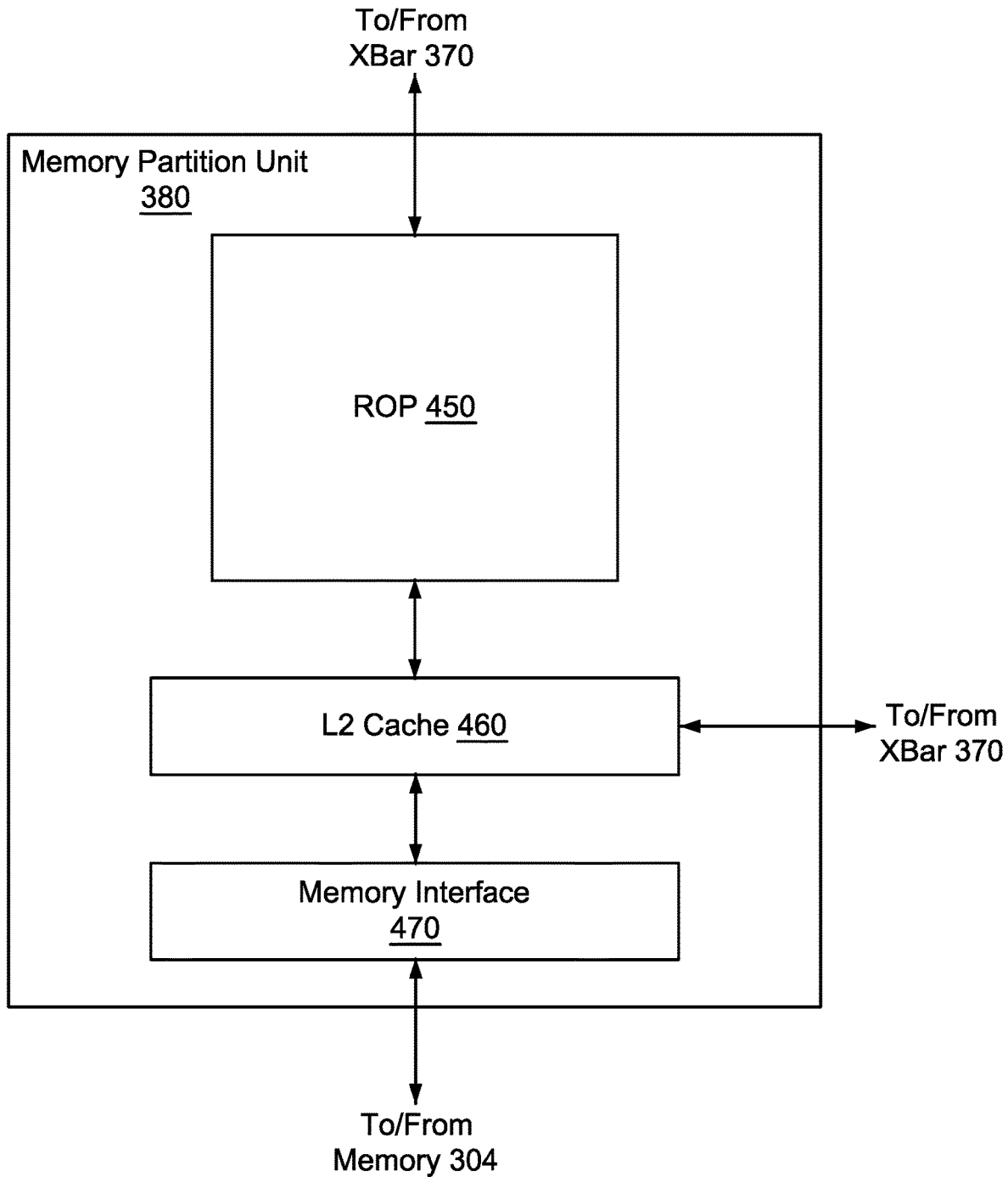
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
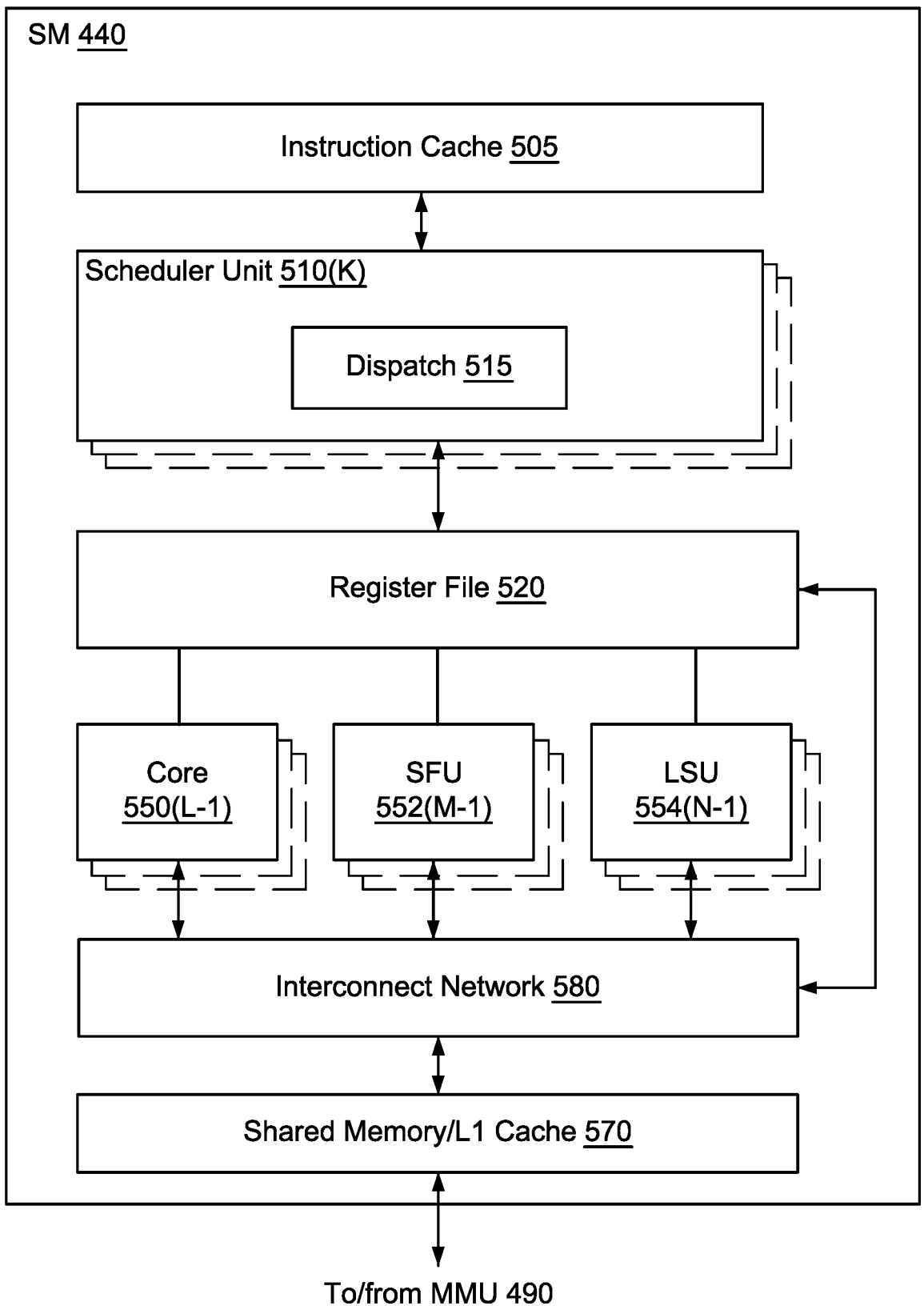
FIG. 5A illustrates the streaming multiprocessor of FIG. 4A, in accordance with an embodiment.

FIG. 5A illustrates the streaming multiprocessor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
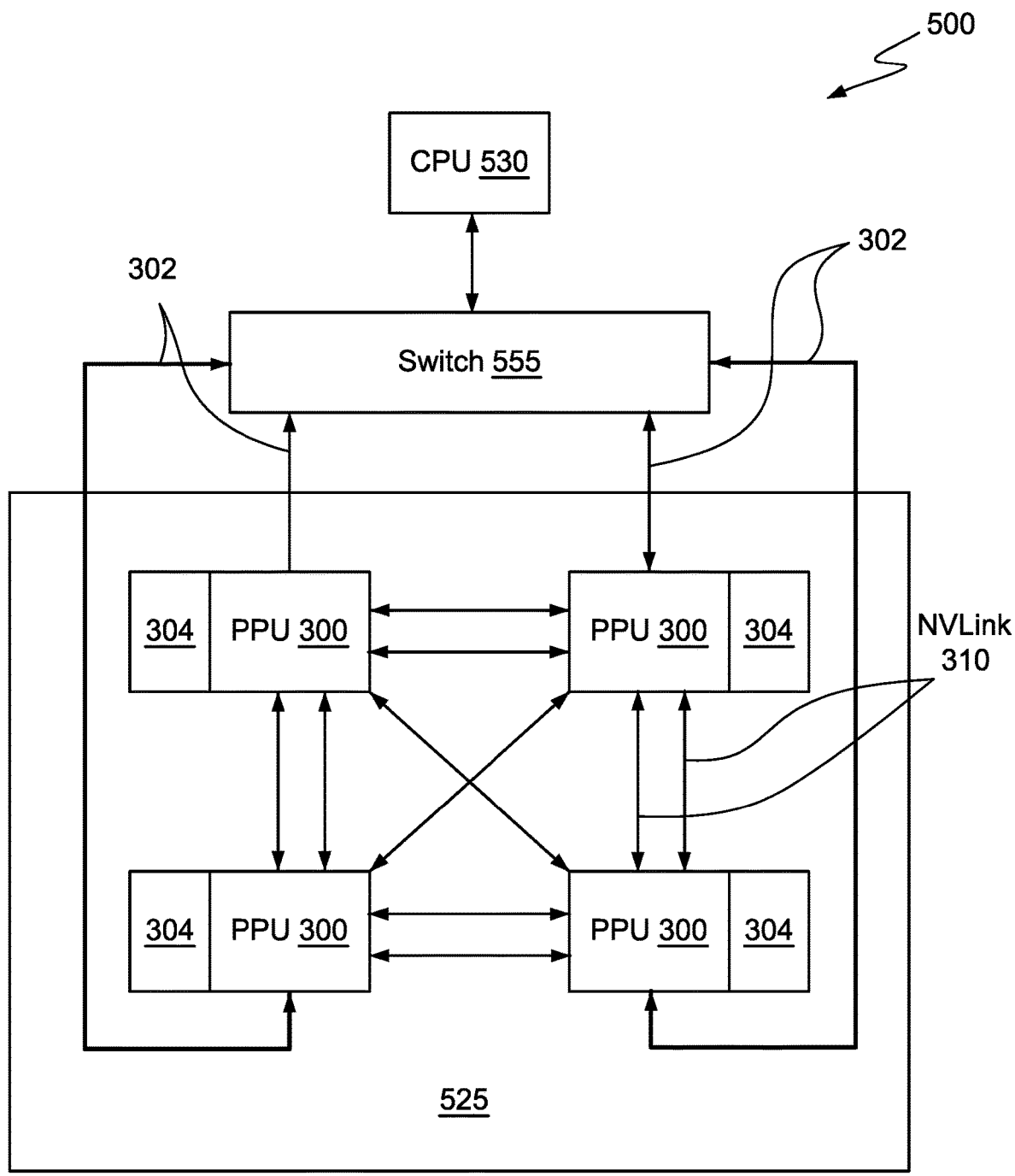
FIG. 5B is a conceptual diagram of a processing system implemented using the parallel processing unit (PPU) of FIG. 3, in accordance with an embodiment.

FIG. 5B is a conceptual diagram of a processing system 500 implemented using the PPU 300 of FIG. 3, in accordance with an embodiment. The exemplary system 500 may be configured to implement the methods 210, 220, 230 and 240 shown in FIGS. 2A-2E. The processing system 500 includes a CPU 530, switch 555, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 555 interfaces between the interconnect 302 and the CPU 530. The PPUs 300, memories 304, and NVLinks 310 may be situated on a single semiconductor platform to form a parallel processing module 525. In an embodiment, the switch 555 supports two or more protocols to interface between various different connections and/or links.

In another embodiment (not shown), the NVLink 310 provides one or more high-speed communication links between each of the PPUs 300 and the CPU 530 and the switch 555 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 555 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 555. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 555, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
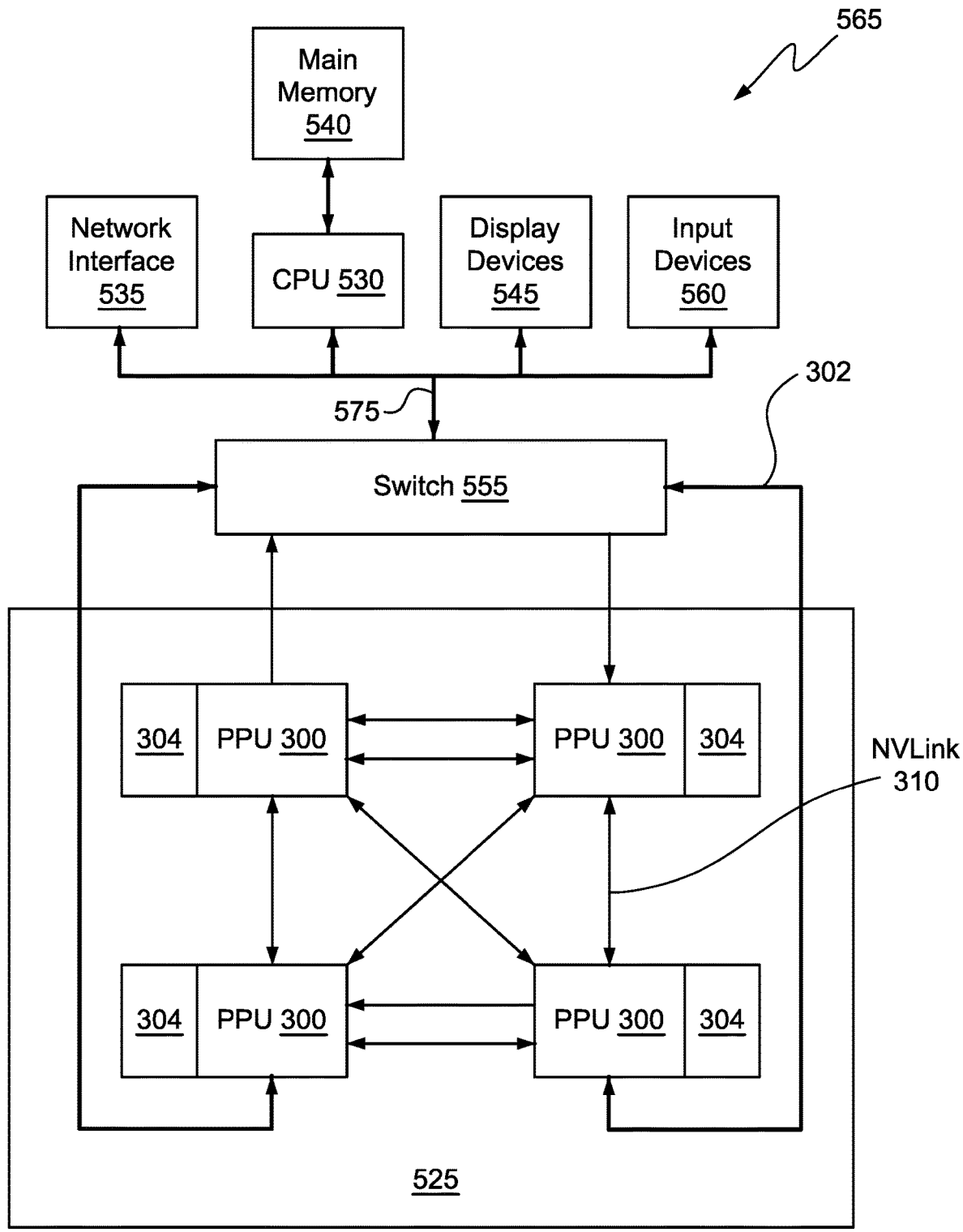
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the methods 210, 220, 230 and 240 shown in FIGS. 2A-2E.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
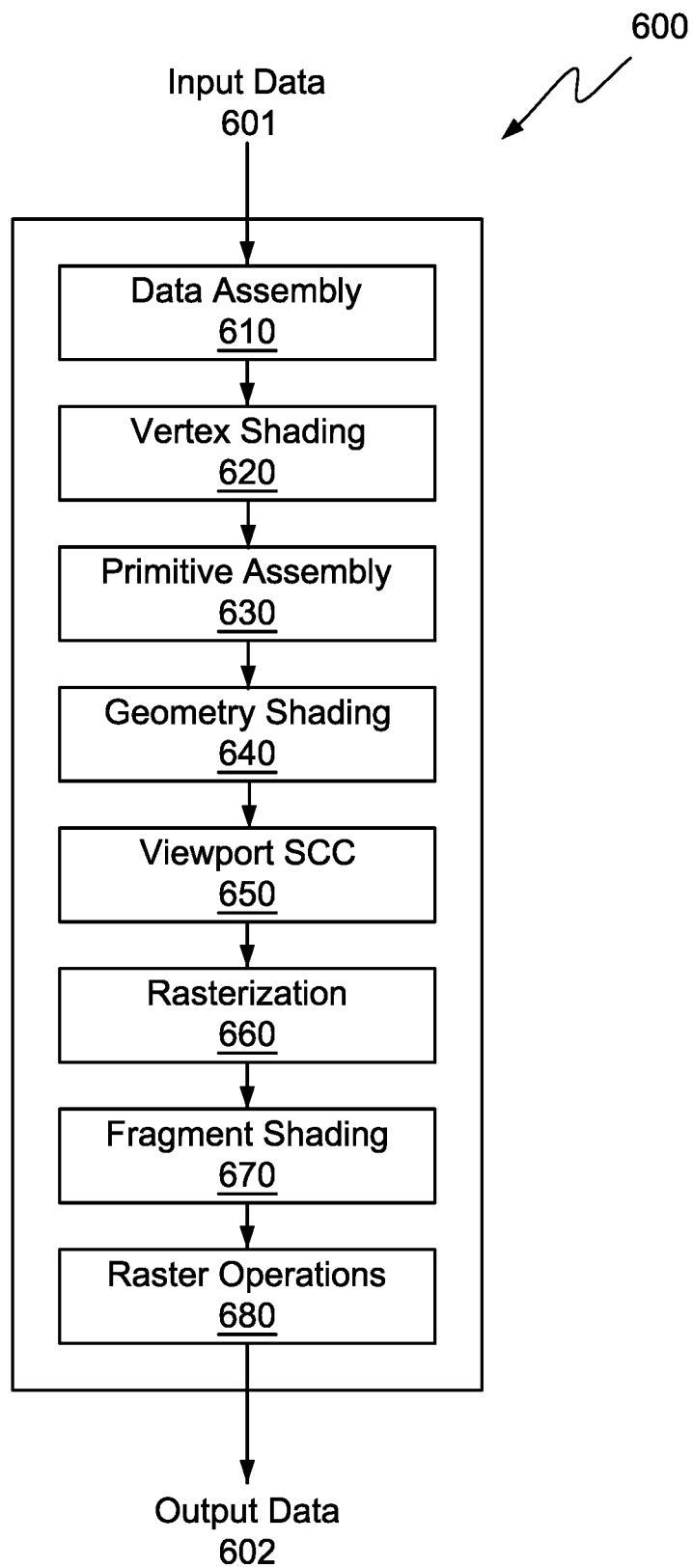
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Example Technical Advantages of Some Dynamic Jitter and Latency Tolerant Embodiments Certain example embodiments provide for improved virtual reality and/or other real-time graphics rendering. In particular, certain example embodiments improve graphics display in streaming environments where the image rendering server is connected over a network or other wireless connection to the actual display device. In contrast to conventional efforts to improve the displayed video quality in streaming environments, certain example embodiments are designed to address multiple issues of real-time graphics display artifacts including stutter, latency, and screen tearing, simultaneously. Stutter is reduced or eliminated by implementing a jitter buffer; latency is reduced by actively and dynamically minimizing the time frames spend in the jitter buffer; and screen tearing is reduced or eliminated by dynamically adjusting the frame rate of the application on the rendering server in accordance with the actual refresh rate of the client display. The dynamic nature of the jitter-tolerance techniques used in embodiments provide for a highly flexible system that can provide high quality streaming video in many types of client-server environments and many different types of networks and/or connections between server and client. Additionally, some example embodiments also provide for reducing the power consumption by avoiding or reducing the generation of frames that exceed the display capabilities of the actual display. Still further, some embodiments have the benefit of not requiring the maintenance of clocks that are synchronized between the client and server devices. Still further, some embodiments can provide the benefit of dynamic jitter-tolerant real-time image display for any type of image format.

Some embodiments may be usable to improve the quality of streamed video between any type of rendering server and any type of client device with a display. Some embodiments may include systems for cloud rendering of streamed video to stationary or mobile/portable client devices, such as, for example, personal computers, game consoles, smartphones, handheld computers, VR goggles, head-mounted displays, and consoles in vehicles. Other embodiments may include virtual reality gaming over a wireless or other type of connection, and the like.

Numerous modifications and variations of the present invention are possible in light of the above teachings. It is therefore to be understood that within the scope of the appended claims, the invention may be practiced otherwise than as specifically described herein.

What is claimed is:

1. A system comprising:
   a frame provider configured to provide a sequence of image frames for consumption by a frame consumer;
   the frame consumer being configured to consume said provided sequence of image frames at a predetermined consumption rate, and to monitor arrival times of the provided image frames in relation to the predetermined consumption rate, wherein the frame consumer is further configured to display the image frames through a jitter buffer,
   wherein the frame provider is further configured to adjust a rate at which it provides image frames to the frame consumer based at least in part on the monitoring.

2. The system according to claim 1, wherein the frame provider is further configured to control an executing application in accordance with user input received from the frame consumer.

3. The system according to claim 1, wherein the frame provider is further configured to change a compression rate of one or more of the image frames based on a bandwidth saturation level determined in accordance with arrival times at the frame consumer of packets of an image frame.

4. The system according to claim 1, wherein the frame provider is further configured to change frame rate by either speeding up or slowing down the frame rate.

5. The system according to claim 1, wherein the frame consumer is configured to compare arrival times of the image frames to respective expected arrival times, and to include information about the comparison in monitoring information fed back to the frame provider.

6. The system according to claim 1, wherein the frame consumer is further configured to calculate a jitter absorption parameter and to accordingly configure a size of the jitter buffer.

7. The system according to claim 1, wherein the frame provider is further configured to stream image frames to the frame consumer for real-time display.

8. The system according to claim 7, wherein the frame provider is further configured to stream image frames over a communication network to the frame consumer.

9. The system according to claim 7, wherein the frame provider is further configured to transmit the image frames over a wireless connection to the frame consumer.

10. The system according to claim 1, wherein the frame provider is further configured to change a frame rate for providing the image frames to the frame consumer based upon whether one of said image frames arrives at the frame consumer earlier or later than a corresponding refresh interval.

11. The system according to claim 10, wherein the frame provider is further configured to change the frame rate based also upon jitter in the monitored arrival times.

12. The system according to claim 11, wherein the frame provider is further configured to change the frame rate based also on at least one of a latency associated with the jitter buffer, and a threshold number of dropped frames permitted.

13. The system according to claim 1, wherein the frame consumer is further configured to insert the image frames into the jitter buffer after decoding of the image frames.

14. The system according to claim 13, wherein the frame consumer is further configured to warp the image frame after said decoding.

15. The system according to claim 14, wherein the frame consumer is further configured to perform said warping after the image frames are retrieved from the jitter buffer.

16. A method of streaming video from a video rendering server device to a client device connected to a display device, comprising:
   receiving monitoring information from the client device, wherein the monitoring information includes arrival times of respective image frames of the streaming video, wherein the respective image frames are displayed on the display device through a jitter buffer; and
   adapting a frame rate at which image frames of the streaming video is generated by either speeding up or slowing down the frame rate in accordance with the received monitoring information in order to transmit the image frames with improved synchronization with a refresh interval of the display device.

17. The method according to claim 16, wherein the adapting is only by either speeding up or slowing down the transmitted frame rate.

18. An electronic device comprising a display, a memory, a network interface and at least one processor configured to:
   repeatedly measure differences between respective arrival times at the electronic device of image frames containing images generated by an application running on a remote server and expected arrival times for said image frames;
   transmitting information regarding the measured differences to the remote server;
   adapting a size of a jitter buffer in the memory in accordance with at least the measured differences;
   inserting said data frames in the adapted jitter buffer; and
   displaying images on the display device based on said data frames inserted in the adapted jitter buffer.

19. The electronic device according to claim 18, wherein the at least one processor is further configured to determine the expected arrival times in accordance with a display rate of the display device.

20. The electronic device according to claim 19, wherein the display rate is determined in accordance with the vertical synchronization (vsync) signal associated with the display device.

21. The electronic device according to claim 20, wherein the information regarding the measured differences as transmitted to the remote server is configured to enable the remote server to change a frame rate at which the data frames are transmitted from the remote server such that the subsequent said differences are gradually reduced.

22. The electronic device according to claim 21 comprises a virtual reality headset incorporating the display device, wherein the network interface connects the virtual reality headset to the remote server over a wireless network.

23. A server comprising a memory, a network interface, and at least one processor configured to:
- execute an application generating data frames of images;
- repeatedly, in response to network jitter and/or latency information received from a client device view the network interface, adapting a frame rate and transmitting the data frames to the client device via the network interface at the adapted frame rate.

24. The server according to claim 23, wherein the at least one processor includes a graphics processing unit (GPU) which performs the generating of said data frames at a frame generation rate, and wherein said adapting further includes adapting the frame generating rate in accordance with the received network jitter and/or latency information.

25. A non-transitory computer readable storage medium storing instructions that when executed by a processor of a streaming video rendering server device to a client device connected to a display device, comprising:
- receiving monitoring information from the client device, wherein the monitoring information includes arrival times of respective image frames of the streaming video, wherein the respective image frames are displayed on the display device through a jitter buffer; and
- adapting a frame rate at which image frames of the streaming video is generated by either speeding up or slowing down the frame rate in accordance with the received monitoring information in order to transmit the image frames with improved synchronization with a refresh interval of the display device.

* * * * *